United States Patent
Andelman

(12) 
(10) Patent No.: US 10,294,131 B2
(45) Date of Patent: May 21, 2019

(54) POLARIZED ELECTRODE FOR FLOW-THROUGH CAPACITIVE DEIONIZATION

(75) Inventor: Marc D. Andelman, Worcester, MA (US)

(73) Assignee: Mespilus Inc., Worcester, MA (US)

(*) Notice: Subject to any disclaimer, the term of this patent is extended or adjusted under 35 U.S.C. 154(b) by 975 days.

(21) Appl. No.: 14/006,858

(22) PCT Filed: Mar. 23, 2012

(86) PCT No.: PCT/US2012/030439
§ 371 (c)(1),
(2), (4) Date: Feb. 5, 2014

(87) PCT Pub. No.: WO2012/129532
PCT Pub. Date: Sep. 27, 2012

(65) Prior Publication Data
US 2014/0346046 A1    Nov. 27, 2014

Related U.S. Application Data

(60) Provisional application No. 61/466,854, filed on Mar. 23, 2011.

(51) Int. Cl.
*C02F 1/469*     (2006.01)
*H01G 11/24*     (2013.01)
(Continued)

(52) U.S. Cl.
CPC ........... *C02F 1/4691* (2013.01); *H01G 11/30* (2013.01); *H01G 11/56* (2013.01);
(Continued)

(58) Field of Classification Search
CPC .................. C02F 1/4691; H01G 11/00–11/86
See application file for complete search history.

(56) References Cited

U.S. PATENT DOCUMENTS 3,244,612 A    4/1966   Murphy
3,357,930 A    12/1967  Marks
(Continued)

FOREIGN PATENT DOCUMENTS

EP        2 253 592 A1    11/2010

*Primary Examiner* — Steven A. Friday
(74) *Attorney, Agent, or Firm* — IP Legal Strategies Group P.C.; Leslie Meyer-Leon

(57) ABSTRACT

The polarized electrode flow through capacitor comprises at least one each electrode material, with a pore volume that includes meso and micropores, with contained anionic or cationic groups. The polarized electrodes are in opposite polarity facing pairs, separated by a flow path or flow spacer. Both polarities of the particular attached ionic groups used are ionized at the working pH or composition of the particular feed solution supplied to inlet of the flow through capacitor. The contained groups cause the electrodes to be polarized so that they are selective to anions or cations. The polarized electrode flow through capacitor has better performance compared to identical flow through capacitors made from non-derivitized carbon. The capacitor electrode materials so derivitized provide this polarization function directly without need for a separate charge barrier material.

48 Claims, 12 Drawing Sheets

(51) Int. Cl.
  *H01G 11/32* (2013.01)
  *H01G 11/36* (2013.01)
  *H01G 11/30* (2013.01)
  *H01G 11/56* (2013.01)
  *C02F 103/08* (2006.01)

(52) U.S. Cl.
  CPC ...... *C02F 2103/08* (2013.01); *C02F 2201/46* (2013.01); *Y02E 60/13* (2013.01)

(56) References Cited

U.S. PATENT DOCUMENTS

| | | |
|---|---|---|
| 3,515,664 A | 6/1970 | Johnson |
| 4,153,661 A | 5/1979 | Ree |
| 4,354,958 A | 10/1982 | Solomon |
| 4,373,009 A | 2/1983 | Winn |
| 4,382,875 A | 5/1983 | Solomon |
| 4,585,666 A | 4/1986 | Lambert |
| 4,750,482 A | 6/1988 | Sieverding |
| 4,862,328 A | 8/1989 | Morimuto |
| 5,277,729 A | 1/1994 | Endo |
| 6,295,474 B1 | 9/2001 | Munshi |
| 6,277,514 B1 | 10/2001 | Ying |
| 6,383,427 B2 | 5/2002 | Ishikawa |
| 6,773,468 B2 | 8/2004 | Lang |
| 6,856,840 B2 | 2/2005 | Munshi |
| 7,209,341 B2 | 4/2007 | Yoshitake |
| 7,352,558 B2 | 4/2008 | Zhong |
| 7,368,191 B2 | 5/2008 | Andelman |
| 8,002,963 B2 | 10/2011 | Andelman |
| 8,216,445 B2 | 7/2012 | Anderson |
| 8,518,253 B2 | 8/2013 | Xiong |
| 2002/0167782 A1* | 11/2002 | Andelman ............ C02F 1/008 361/302 |
| 2003/0027051 A1 | 2/2003 | Kejha |
| 2005/0285080 A1 | 12/2005 | Susuki |
| 2007/0247788 A1 | 10/2007 | Sakata |
| 2008/0144256 A1* | 6/2008 | Cai ............ C02F 1/4691 361/502 |
| 2011/0090620 A1 | 4/2011 | Liu |
| 2011/0308953 A1* | 12/2011 | Bazant ............ B01D 61/425 204/520 |
| 2012/0132519 A1 | 5/2012 | Kang et al. |
| 2012/0199486 A1 | 8/2012 | Kang et al. |
| 2013/0153426 A1* | 6/2013 | Sun ............ C02F 1/4691 204/638 |
| 2014/0158527 A1 | 6/2014 | Chung |

* cited by examiner

POLARIZED ELECTRODE FOR FLOW-THROUGH CAPACITIVE DEIONIZATION

This application is the national stage of International Application No. PCT/US2012/030439, filed Mar. 23, 2012, which claims the benefit of the filing date of U.S. Provisional Patent Application Ser. No. 61/466,854, filed Mar. 23, 2011, each of which prior applications is hereby incorporated by reference.

BACKGROUND ART

The present invention relates to water purification, and more particularly to flow through capacitors and capacitive deionization. It is known in the prior art to use an electrode assembly made from opposing pairs of oppositely chargeable high capacitance electrodes for the deionization or purification of water. This is known as a flow through capacitor, or capacitive deionization. Upon application of an electric potential or voltage to terminals connected to underlying current collectors, the electrodes develop a charge. Positively and negatively charged ions present in a water stream attract to and electrostatically adsorb onto the opposite polarity, negatively and positively charging electrodes, respectively, and are removed from solution to form a purified stream. This process is driven by a flow of electronic current due to non faradic capacitive charging. When the flow through capacitor is charged, it may be shunted or reversed in polarity in order to release the adsorbed ions in concentrated form. The purification and concentration streams may be diverted by a valve to a purified stream and a waste stream, in a series of alternating purification and concentration cycles.

A flow through capacitor is a capacitor of the so called "double layer type". The double layer in this context of a capacitive charged electrode refers to the layers of electrostatic charge to which the ions attract and adsorb. These layers include a surface charge layer and a diffuse layer, also known as Stern and Guoy-Chapman layers. The characteristic length thickness of these layers comprising this so called double layer corresponds to the Debye length, also known as the Debye radius. This is estimated in Equation 1 as follows:

$$K^{-1} = \sqrt{\frac{\varepsilon_r \varepsilon_o k_b T}{\sum_i n_i z_i^2 e^2}} \qquad \text{Equation 1}$$

which for the example of a univalent salt reduces to $$K^{-1} = \sqrt{\frac{\varepsilon_r \varepsilon_o k_b T}{2 N_A e^2 I}}$$

Where
$K^{-1}$ is the Debye length
$\varepsilon_r$ is the dielectric constant of the solute
$\varepsilon_o$ is the permittivity of free space
$k_b$ is Boltzman's constant
T is the absolute Temperature in Kelvins
e is the elementary charge
$n_i$ is the concentration of the i'th ionic species in numbers/$m^3$
$z_i$ is the valence of the i'th ionic species
$N_A$ is Avogadro's number
I is the ionic concentration in the solute in moles/$m^3$ Capacitance increases with surface area, which in turn typically requires that the capacitor electrodes are porous and have a pore volume.

Equation 2 is the formula for the amount of the electrode pore volume which is occupied by the double layer in a given ionic feed solution and a given surface area charged porous electrode material.

$$\text{Pore volume occupied by the double layer} = A * K^{-1}, \qquad \text{Equation 2}$$

where A is the electrode material microscopic pore surface area. In this context, a microscopic electrode pore surface is a surface of the electrode pores, whether micro-, meso-, or macropores. Under some typical feed water conditions, the Debye length is of the same order of magnitude as the average pore radius in micro and meso porous capacitive deionization electrodes. Therefore the pore volume occupied by the double layer can constitute the majority proportion of the total pore volume. This Debye length defined double layer pore volume is the region across which the voltage, or potential difference, in the charged capacitor drops. This electrical potential difference is caused by the distribution of charges within the double layer resulting from the attraction, expulsion and adsorption of charged ions during the process of deionization.

SUMMARY OF THE INVENTION

It has been surprisingly discovered that capacitive porous electrodes incorporating ionized, ionic group molecules contained within the pore volume and Debye length region of the double layer volume have enhanced coulombic efficiency when used in flow through capacitors. Coulombic efficiency is necessary to achieve better purification, water, and energy efficiency. It has further been discovered that these electrodes become selective for anions or cations and that the electrodes and flow through capacitor become polarized in response to an applied electric potential or voltage.

Electrode materials may be in the form of individual particles or pieces of capacitive material, and may refer to an integral composite or a sheet of electrode material composed therefrom. The electrodes have micropores, mesopores, or both kinds of pores. The electrodes may be entirely microporous, entirely mesoporus, entirely microporous and mesoporous, a mixture of micropores or mesopores with macropores, or a mixture of micropores and mesopores with macropores." The ionic group molecules are contained within the electrode pores, including the micro and mesopores, and also any macropores. The ionic group molecules are ionized so as to have a charge that serves to exclude co-ions from the double layer volume. This mechanism is similar to what is generally known as Donnan exclusion in ion exchange membranes. Exclusion of co-ions enhances desirable coulombic efficiency. Unless excluded, these pore volume co-ions are expelled from the electrode during capacitor charging, contaminate the feed stream and thereby lower coulombic efficiency. The electrode assembly contains two kinds of electrodes in one or more opposing pairs. Each kind of electrode in an opposing pair contains one of two types of ionic group carrying molecules, anionic or cationic. One of each kind of paired electrode faces each other across a flow spacer. The electrode contained anionic groups and cationic groups each have a pKa. The pKa of the anionic and pKa of the cationic groups bracket the pH of the feed solution, so that the contained ionic groups are ionized. Each kind of electrode is at least partially impermeable to ions similar in charge polarity to its contained ionic groups, and permeable to ions opposite in charge polarity to these ionic groups. The electrode assembly is polarized by virtue of achieving better purification when charged in the positive than in the negative polarity. "Contained" or "held" in the context of ionic groups, applies to the ionic groups held inside the electrode pore volume, not the ions which move into or out of the electrode from the feed solution flowing through the flow spacer.

The ionic group carrying molecules may be contained within the electrode pore volume by derivitization of the porous capacitive electrode materials so as to attach ionic group molecules to the pore surface area. Ionic group molecules so contained may be robustly attached, irreversibly attached, or weakly attached and held inside the pores by an blocking material layer which is electrically neutral, ion neutral, or both. Attachment may be achieved by physisorption, also known as physical adsorption, preferably through a strongly adsorbing group, for example a hydrophobic moiety. The hydrophobic moiety may be the tail of a surfactant. Robust attachment may be achieved by chemisorption and the use of chemical reactions to form of a covalent bond.

In another embodiment, the ionic group carrying molecules may be contained within the electrode pore volume by a semipermeable blocking layer. This layer blocks or confines ionic group molecules from diffusing outwards, or from being driven outwards by electric fields, into the fluid flow and confines them within the pore volume. The blocked ionic group molecules may in this case either be dissolved within the pore volume solution or attached to the pore surface area. Containment by either blocking layers, derivitization, or a combination of these methods, limits or eliminates the problem of ionic group molecules washing off of or being driven Off of the electrode material Another embodiment provides an ion species selective flow through capacitor.

A third embodiment provides a coulomb efficient flow through capacitor that may be easily spiral wound.

According to invention, there is provided an efficient flow through capacitor. Other advantages and features of the invention will become apparent from the following description including the drawings and claims.

BRIEF DESCRIPTION OF THE DRAWINGS

The foregoing features of the invention will be more readily understood by reference to the following detailed description, taken with reference to the accompanying drawings, in which element numbers are assigned to those elements indicated in Table 1.

TABLE 1

Figure 1:
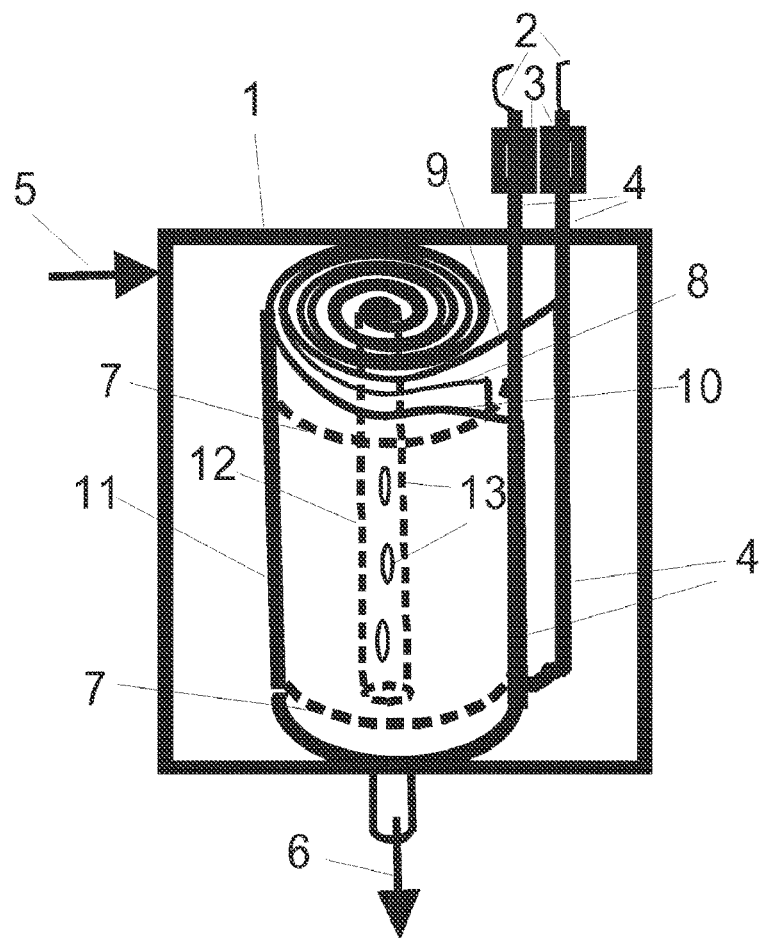
FIG. 1 is a depiction of a spiral wound flow-through capacitor and cartridge holder.

| Drawing Element Number | Element |
|---|---|
| 1 | Cartridge holder |
| 2 | Wire or other electrical leads |
| 3 | Fastener |
| 4 | Current collector tabs |
| 5 | Fluid inlet |
| 6 | Fluid outlet |
| 7 | Sealing means |
| 8 | Flow spacer |
| 9 | Double sided cation responsive electrode |
| 10 | Double sided anion responsive electrode |
| 11 | Spiral wound flow through capacitor cell |
| 12 | Central support or mandrel |
| 13 | Optional through holes in central support |
| 14 | Optional protective layer |
| 15 | Cation responsive electrode |
| 16 | Anion responsive electrode |
| 17 | Current Collector |
| 18 | End plate |
| 19 | Flat surface conductive contact |
| 20 | Bound anionic groups |
| 21 | Bound cationic groups |
| 22 | Surface area porous capacitive electrode or substrate |
| 23 | DC current |
| 24 | Individual particle, fiber, or piece of capacitance material |
| 25 | Surface area providing pore |
| 26 | Attached tether or linker means |
| 27 | Attached dendritic, branched, brush, or multiple group ionic polymer, surfactant, or ionophore |
| 28 | Attached single group ionic polymer, ionophore, or surfactant |
| 29 | Individual ionic groups or ionophores attached to polymers, surfactants, or linking means. |
| 30 | Attached polyelectrolyte or polyionic surfactant |
| 32 | Anionic Ionic group molecules contained within the electrode pore volume |
| 33 | Cationic Ionic group molecules contained within the electrode pore volume |
| 34 | Blocking layer |
| 35 | Solution phase anion |
| 36 | Solution phase cation |
| 37 | Arrow indicates direction of ionic movement when electrodes are charged at the polarity applied to wire leads as shown |
| 38 | Current collector for true series cell |
| 39 | End electrode |
| 40 | Intermediate electrode |
| 41 | Outer tortuous flow channel |
| 42 | Inner tortuous flow channel |
| 43 | Tortuous flow channel inlet |
| 44 | Central flow hole |
| 45 | External gasket |
| 46 | Internal gasket |

DETAILED DESCRIPTION

Definitions. As used in this description and the accompanying claims, the following terms shall have the meanings indicated, unless the context otherwise requires:

Attached used in connection with ionic groups is synonymous with fixed, adsorbed, or adhered to the pore surface of the electrode material substrate.

A flow through capacitor "cell" is a portion of the overall flow through capacitor system housed within a cartridge holder and containing one or more components of the flow through capacitor system.

Cell volume is defined as the sum of the flow spacer plus the cartridge holder dead volumes.

Coulombic efficiency, synonymous with faradaic efficiency, is defined as the ratio of the coulombs of electrons supplied to the capacitor as electronic charge divided by the coulombs of ionic charge removed from a feed solution during purification. Coulombic efficiency may be calculated by dividing the integral of electric current versus time by the integral of ions purified versus time during the purification charge cycle. To obtain an accurate measure of coulombic efficiency, it is important to take into account the total amount of coulombs of electrons and coulombs of ions during a purification charge cycle. Accordingly, care must be taken to integrate versus time the electronic current in terms of coulombs of electrons from an initial shunt condition of zero volts to the final charge voltage, and the integral versus time of the ion purification curve in terms of coulombs of ions removed from solution from the initial feed concentration through the minimum ion concentration reached during purification, and substantially back to the feed concentration after the cell has reached its final charging voltage. This procedure avoids cell dead volume mixing and time lag errors from using instantaneous current and ion removal measurements. Coulombs of ions are converted by comparing conductivity measurements with NIST standard solutions and use of Faraday's constant. A 0.01 M NaCl feed solution is a good experimental standard for comparison purposes with which to make these coulombic efficiency measurements.

Current Density is the current measured in amperage divided by the sum of the areas of the sides of the electrodes facing the flow spacer.

Derivative. This term refers to an electrode material, such as carbon, that has had molecular or atomic groups adsorbed, chemically attached, or bonded to it. This term also refers to a molecule that has had groups adsorbed, chemically attached or bonded to it. Derivitized refers to the process of forming or having formed a derivative.

Donnan exclusion is synonymous with salt exclusion or salt rejection or ion exclusion.

Electrical Series Resistance. The electrical series resistance referred to herein is given in terms of ohms cm2, and equals ohms series electrical resistance multiplied by the facing area in square centimeters of the facing electrode pairs, equivalent to the added single sided area of all of the flow spacers. Synonyms for electrical series resistance include ESR and Rs.

A flow through capacitor system is a series of components that includes capacitive electrodes, one or more optional current collectors, and one or more flow spacers through which a fluid is directed.

Ionic Group Molecule. A molecule that includes one or more ionic groups.

Macropores are defined as pores larger than 50 nanometer in diameter.

Mesopores are pores of 2 to 50 nanometer diameter.

Micropores are defined as pores smaller than 2 nanometer in diameter.

Negative polarity is the reverse of positive polarity, and is the condition where negative, electron carrying electronic current is hooked up to the electrode with the contained cationic group molecule positive, hole carrying electronic current is hooked up to the electrode with the contained anionic group molecule.

Parallel resistance is given in ohms cm2, and refers to the ohms resistancemultiplied by the facing area in square centimeters of the facing electrode pairs, equivalent to the added single sided area of all the flow spacers. Synonyms are leakage resistance, sometimes abbreviated as Rp.

Pore radius is the ratio of a pore volume to the pore surface area. The average pore radius is the ratio of the total pore volume to the total pore surface area of a particular electrode material.

Positive polarity is the condition where positive, hole carrying electronic current is hooked up the electrode with the contained cationic group molecule, and negative, electron carrying electronic current is hooked up to the electrode with the contained anionic group molecule.

Scientific control flow through capacitor is a capacitor that is otherwise identical to the polarized electrode flow through capacitor, with the same electrode material without the added contained or attached ionic groups. This scientific control is used to compare the results of adding these groups to the electrode material.

Single electrode capacitance. This is a capacitance of a single electrode, either anode or cathode.

Surface attached groups are synonymous with attached groups, and refer to molecular groups with ionic moieties attached to the surface area on the pore surfaces within a porous electrode material.

Total capacitance is the capacitance measured across the entire cell, anode, and cathode capacitance included. This is different from single electrode capacitance because capacitors of the so called "double layer" type are really two capacitors in series, comprising an anode and a cathode single electrode capacitance.

Earlier reports include use of faradaic processes, low surface area carbon materials for one or more electrodes, thick electrodes, loosely packed beds of carbon, use of thin wire current collectors, degradation of performance over short periods of time, use of acidic oxygen groups that have since been recognized to cause electrode degradation, as referenced in Journal of Power Sources, vol. 157, pages 11-27 (2006), excessively slow flow purification rates of only two cell volumes per hour, long charge cycle of six hours or more, and six to twelve hours for electrode exhaustion, which is the return of effluent, product water conductivity to that of the feed solution. Faradaic reactions, in addition to wasting or using non-recoverable energy, generate hydroxyls and caustic compounds that degrade cell materials and cell performance over time, and cause minerals to precipitate, leading to undesirable fouling. Thick electrodes, such as in for example the flow through electrode design of U.S. Pat. No. 3,515,664, have a dead volume that leads to coulombic inefficiency due to mixing between concentrated solution held over inside the electrode dead volume from a previous concentration cycle with the purified water from a subsequent purification cycle of the flowing solution being treated. See, for example:

G. W. Murphy and D. D. Caudle, "Mathematical Theory of Electrochemical Demineralization" in Flowing Systems Electrochemical Acta, 1967, Vol 12, pp 1655-1664. Pergamon Press Ltd.

Danny D. Caudle et al, "Electrochemical Demineralization of Water With Carbon Electrodes", U.S. Department of the Interior, Office of Saline Water, Research and Development Progress Report, No. 188, May (1966) U.D. Department of Commerce National Technical Information Service PB207007.

G. W. Murphy et al, "Demineralization of Saline Water by Electrically-Induced Adsorption on Porous Carbon Electrodes", U.S. Department of the Interior, Office of Saline Water, Research and Development Progress Report No. 92, March (1964).

G. W. Murphy, "Demineralization Electrodes and Fabrication Techniques Therefor", U.S. Pat. No. 3,244,612, issued Apr. 5, 1966 (hereby incorporated by reference).

Allan M. Johnson, A. Wayne Venolia, Robert G. Wilbourne and John Newman, "The Electrosorb Process for Desalting Water", U.S. Department of the Interior, Office of Saline Water, Research and Development Progress Report No. 516 March (1970).

A. W. Venolia and A. M. Johnson, "Development of Electrochemical Ion Exchange Materials and Techniques for Desalting Water", United States Department of the Interior, Office of Saline Water, Research and Development Progress Report No. 300 January (1968).

For the purpose of enablement, the following patents will be known to those of ordinary skill in the art, and each such patent is hereby incorporated by reference in its entirety: U.S. Pat. Nos. 3,244,612, 3,515,664, 5,200,068, 5,360,540, 5,415,768, 5,538,611, 5,547,581, 5,620,597, 5,954,937, 6,413,409, 6,709,560, 7,368,191, WO2009062872, WO 2009062872 A1, EP 2 253 592 A1, and US2011/0042205 A1.

As described in U.S. Pat. No. 6,709,560, Andelman previously provided a solution to the problem of coulombic inefficiency due to pore volume ions by use of a so called "charge barrier", also sometimes called membrane capacitive deionization. The charge barrier material adds cost and manufacturing complexity, and electrical series resistance. The "charge barrier" is a discrete, typically cross linked, ion exchange material in the form of layers or coatings, or a coating infiltrated into the electrode itself. The charge barrier is a continuous solid, and an ion exchange material that physically covers up the electrode pores. Materials typically swell differently from the underlying carbon electrode materials when water is applied. Where charge barrier materials are used as a coating or infiltrated into or onto underlying electrode materials, this swelling can tear apart or curl the electrode, tear apart the electrode particles themselves, or force particles apart between each other, all of which can create deleterious effects of electrode material wash off and electrical series resistance, or, lead to lack of uniformity needed for good quality control in manufacture. However, such ion exchange materials swell and shrink depending upon solution conductivity and moisture level, which, when infiltrated into electrode pores, can fracture the electrode material. Movement of the charge barrier material by swelling and shrinking also makes it difficult to maintain uniform compression of flow through capacitor materials within the cell, thereby making it difficult to maintain uniformity of manufacture and performance. The charge barrier operates by trapping solute ions in the electrode pores. These trapped feed solute ions shuttle back and forth between being two states, one state is adsorbed upon the electrode, and the other state is backed up as a concentrated solution against the charge barrier. In addition, the pore volume ions in the charge barrier can be any soluble concentration of ions. The pore volume ions trapped behind the charge barrier can slowly leak out due to imperfections in the selectivity of the membrane.

In the charge barrier system of U.S. Pat. No. 6,709,560, counterions from the feed solution move through the charge barrier membrane to balance the charge to help form this backed up concentrate, thereby effecting a purification. The charge barrier portion of the system is therefore similar to electrodialysis. Pore volume ions, which would otherwise be expelled into and contaminate the flow spacer purification fluid to cause coulombic inefficiency, are trapped and held inside the electrode and electrode pores and form a concentrate against the charge barrier. The charge barrier spaces the electrodes further apart, thereby making the cell bigger and adding series resistance. For example, commercial charge barrier materials often add over 1 ohm cm2 in additional resistance. In addition, Piotr Dlugolecki et. al., Journal of Membrane Science, vol. 346, pages 163-171 (2010), reports that charge barrier materials used in prior art capacitive deionization exhibit a strong increase in electrical series resistance at low concentrations, for example with feed solutions below 0.1M NaCl, thereby further limiting current density, which would lower the ion purification and flow rate at low concentrations. Concentration polarization on the flat charge barrier membrane surface causes an increase in electrical series resistance and thereby limits the current density. Unfortunately, low concentration solutions and brackish water represent common application areas. Therefore, a need exists for a high coulombic efficiency, high flow rate performance, high water recovery, low energy usage flow through capacitor, without need for a discrete charge barrier component.

It has been discovered that flow through capacitor electrodes with contained ionic groups can achieve high purification rates and good coloumbic efficiency without need to use discrete ion selective material charge barriers. The individual members of the electrode pairs comprising the resulting polarized electrode flow through capacitor contain, in opposition to each other, one of each polarity kind of charged ionic groups, anionic and cationic. The "polarized electrode flow through capacitor", described herein, operates by excluding solute ions from the electrode pores. This does not require an extra component, such as the charge barrier ion exchange material, in order to achieve improved coulombic efficiency. Because the polarized electrode flow-through capacitor operates by excluding feed solute co-ions from the electrode pores in the first place, the feed solute cations and anions are purified from solution when they move into and out of the electrodes charged under positive polarity, not in response to a concentrate backed up against a charge barrier.

The concentration of pore volume ions in the polarized electrode flow through capacitor is determined by the charge needed to balance the ions contained in the pores, thereby excluding excess ions and, upon application of an electronic potential to the electrodes, making the charging electrodes selectively more permeable to counterions as opposed to co-ions.

In contrast to the charge barrier, in which co-ions are expelled from the pore volume by a voltage, the polarized electrode excludes co-ions from inhabiting the pore volume, preventing them from going there in the first place by the contained ionic groups contained within the electrode pore volume.

The performance improvements of the polarized electrode flow through capacitor are measureable when compared to otherwise identical, identically operated, scientific control, flow through capacitors made with electrodes that do not contain or have not been derivitized with ionic groups. The polarized electrode flow through capacitor containing ionic groups achieves high coulombic efficiency, for example 50% or higher.

The use of contained ionic groups within the polarized electrode flow through capacitor came from the realization that it is the distribution of ionic charges that develops within the double layer volume which governs coulombic efficiency. This double layer volume pore volume may comprise a portion of, or all of, the total pore volume. On the other hand, it is the total pore volume which determines water recovery, because the solution held within the total pore volume is what dilutes the concentrated waste, thereby lowering water recovery. Therefore, increasing the double layer volume to total pore volume ratio, for example, to 10% or more, decreases dilution of concentrate within the pore volume and increases recovery. Increasing the total pore volume to cell volume ratio, for example to 10% or more, also decreases dilution of concentrate within the flow spacer and cartridge holder and increases recovery.

The importance of the double layer region to coulombic efficiency follows from the fact that the voltage or electrical potential on the charged capacitor electrodes drops primarily across the Debye length distance, given in Equation 1. For example as calculated from equation 1, this distance is 2.1 nanometers for a 0.01 M univalent salt NaCl feed solution. As a result of this short distance, the electric field strength is very steep in the electrode pore volume region occupied by the double layer, for example on the order of 109 Volts per meter or less. The Debye length is also the distance from the electrode surface over which the ion concentrations are perturbed from their bulk values in an electrically charged capacitor. This means that migration of counterions into and the expulsion of co ins out of a charging flow through capacitor occurs within this region. It is the net electrostatic surface adsorption within this electrode double layer region, of counterions initially present in the flow spacer, that allows the flow through capacitors to operate on a flowing solution to perform useful purification of ions from solution. It is expulsion of co-ions from the electrode pore volume which contaminates the fluid stream feeding into the flow spacer and subsequently the product stream feeding out of the flow spacer into the cartridge holder outlet which is the cause of coulombic inefficiency. Coulombic inefficiency is detrimental to the overall amount of ions removed and therefore the function of purification of ions from the feed solution. Exclusion of co-ions from the Debye length, double layer volume by the contained ionic groups prevents the subsequent expulsion of the co-ions and is therefore beneficial for couloumbic efficiency. The ionic groups contained within the electrode pore structure by virtue of being in proximity in sufficient quantity to the electrode pore surfaces, electrostatically affect the double layer region so as to exclude the detrimental co-ions. Proximity is achieved by electrode pore surface derivitization, or by a blocking layer that confines solutions of ionic group molecules within the total electrode pore volume. The electrode ionic groups so contained are thereby prevented from being expelled by electric fields, diffusing away, desorbing, or from washing out into the flowing solution. Therefore, the ionic groups are present in sufficient quantity within the electrode pores to electrostatically influence this double layer region in order to increase the net overall migration of both polarities of counterions into the double layer volume regions. Electrodes are in pairs of opposite polarities. Therefore the counterions and co-ions each include both polarities of ions, anions and cations.

In order for pore volume contained ionic groups to electrostatically influence and exclude co-ions from as much of the double layer volume as possible, it is optimal that the double layer volume occupy as much of the total electrode pore volume as possible. Therefore, the preferred electrode materials, which are typically but not always carbons, are of low specific volume and with a preponderance of pores with pore size or pore radius towards the scale of the double layer length or Debye length. This preferred pore size distribution corresponds to electrodes with micropores and mesopores. In any case, it is therefore desirable to keep macroporosity low, for example below 40% of the total pore volume. Electrodes with a pore size distribution whereby more than 30%, for example more than 60% of the pore volume comprise micropores and/or mesopores, are preferred. An average electrode pore size of under 50 nanometers, for example, 20 nanometer or less is preferred. Total electrode pore volume is typically less than 1.5 cubic centimeters per gram, for example less than 1 cubic centimeters per gram, or less than 0.5 cubic centimeters per gram. For use in composite electrodes using binders, the use of small sizes of carbon particle or fiber is also important, so as to decrease the interstitial pore volume. For example, it is preferred that most of the individual particles or fibers used together within an integral electrode are 100 microns or less wide, optimally less than 50 microns wide. Different sized particles may be mixed together to form an integral electrode together with binder. In this case, small particles may be used to fill in the voids between larger particles, for example using 10 micron or less in diameter carbon black mixed together with an average particle size of 50 micron or less activated carbon, may be used in order to reduce the size of the interstitial pores. These criteria are important for both of the electrodes in an anode and cathode pair, which are used together in a flow through capacitor electrode assembly. Porosity may be determined, and surface area may be approximated by the iodine number, by using for example the ASTM D4607 standard test method for determination of iodine number of activated carbon.

The exclusion of co-ions from the electrodes is caused by the electrostatic field of the ionic groups contained or confined within the electrode pores, and is known as Donnan, or ion exclusion. It is helpful to have a formula to estimate the amount of Donnan exclusion provided by a given amount of electrode contained ionic groups under given solution conditions. A formula for the estimation of Donnan exclusion for an electrolyte is given by equation 3 below, as a function of ion concentration equivalents. Equation 3 is a mass balance that applies at a minimum to the double layer volume given by equation 2, which is that portion of the electrode total pore volume within a Debye length of the electrode surface. Equation 3 applies at a maximum to the entire electrode pore volume.

$$\text{co-ion}_{inside}/\text{co-ion}_{external} = \text{co-ion}_{external}/(\text{co-ion}_{inside} + (\text{contained ion})) \quad \text{Equation 3}$$

where "co-ion$_{inside}$" and "co-ion$_{external}$", mean the equivalents of solution phase co-ions inside and outside of the electrode respectively, and "contained ion", means the equivalents of ionic groups contained in the electrodes, for example as attached, fixed, or confined on the surfaces of the electrode pores or within the pore volume. In equation 3, the solute ions external to the electrode "co-ion$_{external}$" are in equivalents per liter of feed solution, and the ions internal to the electrode "co-ion$_{inside}$ and "contained ion" are given in equivalents per liter of electrode pore volume solution. This internal electrode pore volume can, for example, be determined by subtraction of dry electrode from wet electrode weight to obtain the weight of water in the electrode pores, and then calculated from the known density of water, or other solute used, at a particular temperature. The ratio on the left hand side of equation 3 is the fraction of co-ions inside the electrode to co-ions outside the electrode, after co-ion exclusion from the portion of the electrode pore volume affected by the contained ionic groups. Where the Debye length equals or exceeds the average electrode pore radii, for example in meso, micro porous materials, the ratio in equation 3 applies to practically the total electrode pore volume. Where the Debye length is less than the average of the electrode pore radii, for example in a macroporous material, the Donnan exclusion ratio may not apply to the total electrode pore volume. In that case, this ratio may be corrected by multiplying Equation 3 by a ratio given by the Debye Length over the average pore radius, or by one, whichever is smaller. The ionic group molecules may also in some case be long enough with high enough molecular weight to extend beyond the Debye length and at partially or completely fill the larger pores and macropores. In those cases, the estimate of the Donnan exclusion as a function of the total electrode pore volume may be corrected by multiplying the equation 3 result by the ratio of the average extended length of the ionic group molecule divided by the average of the electrode pore radii, or by one, whichever is smaller. The extended length varies as a function of particular feed solution conditions used. Excluding co-ions from the pore volume, including any pores and macropores beyond the double layer volume, is beneficial to water recovery, for example, to achieve 80% or more purified water as a percentage of total Teed water.

It may be seen from equation 3 that, for a given set of conditions of feed water ionic concentrations, the concentration of confined ionic groups within the electrodes can exclude and thereby determine the concentration of solute co-ions inside the electrodes. The concentrations in moles per liter can be calculated from equivalents by dividing by the number of charges on an ion. The solute co-ions become excluded or depleted within the electrodes due to the influence of the contained ionic groups. Because it is the electrode internal solute co-ions that are a cause of coulombic inefficiency and poor water recovery, a low fractional amount of these ions is desirable. For example it is preferable to have Donnan exclusion of 50% or better of solute co-ions from the electrode internal pore volume solution as compared to the solution outside of the electrodes. The "contained ion", according to equation 3, which are the ionic groups contained within the electrode, should preferably be between 0.1 and 10 mole per kilogram on an electrode material dry weight basis, for example, between 0.5 and 2.3 moles per kilogram.

To be 50% or more Donnan excluded according to equation 3, the fraction of the solute co ion concentration inside the electrode pore volume divided by the solute co ion concentration outside of the electrode pore volume is 0.5 or less. This Donnan exclusion is proportional or equal to and may be used as a measure of coulombic efficiency. One method to measure the Donnan exclusion of solute ion concentration in electrodes is as follows: First, soak a piece of electrode material in a desired concentration of ionic solution representing a feed water, hereinafter solution "A". Next pat the outside surface of the wet electrode dry of excess moisture. Weigh this wet electrode. Next, soak this same wet electrode in a known volume of deionized water overnight. The solution phase, pore volume ions inside the electrode will diffuse into the deionized water. The amount of these ions may be therefore determined by measuring the resultant conductivity of this known quantity of water. The amount of these pore volume ions is calculated from the above conductivity measurement by comparison with conductivity measurements taken from known standard solutions at the same temperature. To calculate the measured percent Donnan exclusion, one also needs to know the amount of water held within the pore volume of the wet electrode. This may be measured by drying an identical electrode soaked in solution "A" in order to remove substantially all the water or moisture. The weight amount of pore volume water may be obtained by subtracting the dry electrode weight from the wet electrode weight, from which the volume of pore volume water may be calculated. This pore water volume is used together with the amount of pore volume ions measured above to calculate the pore volume ion concentration. The percent Donnan exclusion equals the solution "A" ion concentration, minus the pore volume ion concentration, divided by the concentration of ions in solution "A", times one hundred.

By excluding solute co-ions, equal in charge as the case may be to either the positive or negative charged contained ionic groups, the ionic group electrodes are made either anion or cation responsive. The anion responsive electrode selectively prefers to adsorb solute anions, and the cation responsive electrode selectively prefers to adsorb solute cations. In such a polarized electrode flow through capacitor, which utilizes oppositely polarized electrodes, facing each other across a flow spacer, cations are the counterions that move predominantly into and out of the cation responsive electrode, and anions are the counterions that move predominantly into and out of the anion responsive electrode. The contained ionic groups leave the electrodes permeable to counter ions, those ions of opposite polarity to the ionic groups. When the chargeable electrode is charged to the like polarity of the contained ionic groups, the feed solution counter ions will pass from the flow spacer into the electrode pore volume and electrostatically adsorb onto the electrode pore surfaces as surface charge, thereby decreasing the concentration of ions in the product solution flowing out through the flow spacer to the cell outlet.

The ion exclusion effect may be verified by an increase in coulombic efficiency, and/or by the fact that electrodes become polarized, to the extent that they purify solutions of ions to a greater extent when a like electric polarity to the ionic polarity of the electrode contained ionic groups is applied, compared to when a reverse polarity is applied. A reverse polarity may purify comparatively less, not purify at all, or may concentrate the solution flowing from the flow spacer. The contained ionic group electrodes and flow through capacitor are polarized in that, upon application of a negative electric polarity voltage is applied from a DC power supply, the ions present in the flow stream flowing in the flow spacer are not removed from solution to the same extent as compared to when the positive polarity is applied.

For efficient electrostatic function the electrode contained ionic groups also need to be ionized under the working feed water or solution conditions of the flow through capacitor. Accordingly, in order that these contained ionic groups be ionized across a broad range of operating pH's, a preferred method is to contain strong acid and strong base ionic groups within the electrode material of both members of each pair of opposing capacitive cation and anion responsive electrodes respectively. The combination strong acid anionic and strong base cationic groups contained within the pore volume of opposing electrodes are a preferred embodiment because both polarities will simultaneously be highly ionized, for example over 50% ionized, when working under typical practical conditions of most feed water, which is often near neutral, pH 7, for example, between pH 5 and pH 9. However, weak acid and base groups may be substituted for one or both of the strong acid or strong base groups under conditions or pH's whereby these groups are also over 50% or more ionized, for example, under pH 6 for weak basic or over pH 8 for weak acid groups. In general, for good ionization of the ionic groups, the working pH of the feed solution should be 1 pH unit or more higher than the pKa of the anionic groups and 1 pH unit or more lower than the pKa of the cationic groups. To say the same thing from the electrode point of view, the pKa of the anionic, pKa of the cationic, base groups are at least 1 pKa unit higher than the pH of the working feed acid groups is at least 1 pKa unit lower than the pH of the working feed solution, and the solution. To put it another way, it is important for the pKa's of the electrode pore volume contained ionic groups on the opposing, flow spacer facing, electrodes to bracket the pH of the feed solution flowing through the flow spacer. The pKa's, known as dissociation constants, of the ionic group containing electrode materials may be measured by numerous standard and non standard methods, such as pH titration, potentiometric titimetry, spectrophotometric and other methods. The ionic groups are also ion exchangers, and may therefore be quantified by ion exchange titration methods.

A particular application where it may be beneficial to adjust the pH of the feed solution by addition of acids or bases in order to bring the pH below or above neutral would be the treatment of boron or silica. These substances become ionized at non neutral pH's. For example, by addition of base to the feed water, the pH may be raised above pH 8, so that silica, boron, and other substances become ionized and easier to remove with the flow through capacitor and electrode. In this case weak acid groups may be used in addition or instead of using strong acid groups as the electrode contained anionic groups. In other cases, acid may be used to pretreat the feed water in order to render feed water substances more soluble, or less prone to precipitation, for example, when treating water soluble organics, calcium sulfate, calcium carbonate, metals, etc, in which case, weak basic groups may be used as the electrode contained cationic groups.

A further need exists for electrodes containing ionic groups firmly contained or attached in a robust way that do not readily wash off so that they can withstand being rinsed in water during ordinary processes of manufacturing or use, and can operate without significant deterioration, for example, less than 25% performance degradation, with regards to the amount of ions adsorbed per charge cycle, after a hundred or more cycles of purification or charging. Robust attachment may be done by covalent attachment, adsorption through Van Der Waals forces or Pi bonding, or adsorption through ionic bonds.

One way to contain ionic groups within the electrode pore volume is to firmly attach ionic groups to the microscopic electrode pore surfaces is by covalent bonds. Kim Kinoshita describes various reactions and bonding reagents that may be used to derivatize carbon with surface attached groups in "Carbon, Electrochemical and Physiochemical Properties Kim Kinoshita 1988 John Wiley and Sons, Inc." Tables 5.3 and 5.4, herein incorporated by reference. Kinoshita describes polynuclear aromatic structure bonding reagents, and use of silanization and amidation reactions as a means to modify the carbon surface. Oxide groups already present on the surface, or introduced by oxidizing means such as acid, ozone, or dichromate, or electrochemical reactions, may be the source of covalent bonding sites. Carbon electrode material may for example be covalently modified with surface groups by use of various standard organic chemistry techniques such as Friedel Crafts reactions, electro-grafting reactions, electrochemical reduction of aromatic diazonium salts, esterification, dehydration reactions, etc., in order to directly attach ionic groups, or indirectly attach carbon containing molecules that may be later derivatized, oxidized, or reduced by standard chemical reactions to contain anionic groups, cationic groups, or ionophores. Carbon may also be modified by the use of reactive diazonium ion intermediates, and by other standard organic chemical techniques, in order to covalently attach ionic molecules, for example anionic molecules such as paraaminobenzosulfonic acid to form cation responsive electrodes, and cationic molecules containing for example tertiary or quaternary amines to form anion responsive electrodes. The ionic groups may also be covalently attached by a tether or long chain molecule. U.S. Pat. No. 7,368,191 pages 9-10 lists various multiple ionic group molecules such as branched, comb, or dendrimer molecular structures, that may be used in this way to hold the contained ions, herein incorporated by reference. Such multiple ionic group molecules are especially advantageous because they can multiply to two or more the number of ionic groups per electrode surface attachment site that may be attached to a carbon or other capacitive electrode surface. Various means have been reported in the literature for the derivatization of various forms of carbon for various uses, including but not limited to electrodes for use in capacitors, batteries, or electrochemical cells. The following methods and techniques may all be useful to form ionic group modified electrodes, are hereby incorporated by reference. U.S. Pat. No. 5,900,029 describes chemical attachment of ionic group containing molecules to carbon black through reaction with diazonium salts. U.S. Pat. No. 6,414,836 B1 discloses carbon materials, in the form of nanotubes and fullerenes, with various aryl, alkyl, ionic, or quinine groups adsorbed or chemically attached for the purposes of enhancing capacitance of electrochemical, energy storage capacitors. U.S. Pat. No. 4,835,074 describes derivatization or carbon with aryl and other groups, for such uses as electrodes for batteries, energy generating, and energy using electrochemical cells. This patent discloses a first step whereby the carbon is oxidized to increase the number of oxygen containing groups such as carboxyl and quinones, which are further reacted with molecules or combinations of molecules including $SOCl_2$, ammonia, $SO_2$, water, hydrazine, urea, thiourea, guanidine, or their substituted derivatives in order to form various basic or acidic ionic groups. Also according to this patent, amine groups so formed may be further reacted with such reagents as dialkyl sulfates or alkyl halides in order to form quaternary amines containing alkyl groups. U.S. Pat. No. 5,527,640 discloses carbon electrodes for capacitors derivatized with polythiophene polymers containing various groups such as alkyl, aryl, or ionic. U.S. Pat. No. 6,228,942 B1 describes the use of dehydration reactions to form ester linkages in order to chemically graft ionic group containing molecules onto carbon for use in electrochemical cells. US 2005/0244644 A1 also describes the various ionic groups that may be attached to carbon, such as sulfate, phosphate, amine, etc., and also describes methods of spray processing in order to produce carbons with various chemically grafted ionic groups. U.S. Pat. No. 2,821,526 discloses procedures used to attach amine groups to textile fibers, and US patent applications US2005/0112616 A1 and 2006/0040280 describe methods and processes for grafting polymer brushes with ionic and other functional groups onto materials, that may also be modified for use to attach molecules to the electrode pore surface area, and is herein incorporated by reference. Covalent bonds created through chemical reactions are a robust type of bond with which to create pore surface area attached ionic groups on the electrodes.

Another way to contain ionic groups within the electrode pore volume is by adsorption onto the pore surface area of surfactants and ionic group molecules with hydrophobic tails. A hydropobic tail refers to a hydrophobic group to which an ionic group can be attached, for example, a hydrophobic moiety such as cyclic, linear, polymer chains, or branched molecules. It was discovered that a convenient way to durably modify carbon and other materials without the need for multiple step chemical reactions for use as capacitance electrodes is to simply adsorb surfactants onto these materials. Carbon and some other materials which are used in capacitor electrode have an affinity to strongly physically absorb hydrophobic molecules. The hydrophobic tails of surfactants therefore enhance physical absorption of the surfactant molecule to the electrode material, through Van der Waals forces and in some cases through Pi bonding. Surfactants therefore adsorb readily to electrode materials such as carbon. By surfactant surface active molecules are meant. These surfactants, for example, reduce the surface tension or contact angle to water droplets of the electrode or other substrate to which they are adsorbed compared to a substrate without added or adsorbed surfactants. The hydrophobic group, linker, or tether, may be any hydrophobic surfactant moiety known to the art, including aliphatic hydrocarbons, olefins and polyolefins, saturated and unsaturated hydrocarbons, aromatic and polyaromatic hydrocarbons, perylenes, corannulene, alkyl benzenes, paraffins, fatty acids, silicone or silicone containing molecules up to 1000 mers, both straight and branched hydrocarbons up to any number of mers, for example between C1 and C40, and derivatives, combinations, or mixtures of all of these, used separately or together. Generally, because each carbon or other atom contributes additional binding force, two or more such atoms per linker or tether moiety are optimal. The ionic groups may be any ionic group known to surfactant science, including tertiary amines, quaternary amines, sulfonate, sulfate, phosphate, weak acid, strong acid, weak base, strong base, carboxylate, ammonium, quaternary ammonium, polyoxyethylene sulfates, etc. The ionic group may also be chelating agents, complexing agents, or ionophores, either alone or mixed together with other types of groups. Examples of surfactants and complexing agents may be found in "Laundry Detergents" by Eduard Smulders, Wiley-VCH Veglag GmbH, Weinheim 2002. These may include but are not limited to anionic surfactants, sodium dodecyl sulfate, bis(2 ethylhexyl)sulfosuccinate, sodium cholate, sodium taurochenodeoxycholate and cationic surfactants, dodecyltrimethylammonium bromide, diethyl ester dimethyl ammonium chloride, cetyltrimethylammoniumbromide, hexadecyltrimethylammonium halide, amprolium hydrochloride, hexadecylpyridinium bromide,and myristyltrimethylammonium bromide. The surfactants may have two or more multiple hydrophilic or hydrophobic groups, such as bis-alkylphenol alkoxylated gemini surfactant molecules disclosed in U.S. Pat. No. 5,710,121, herein incorporated by reference. Branched, dendritic, multifunctional or so called "hydra" surfactants may be used in order to attach multiple ionic groups per hydrophobic adsorption attachment group.

Silicone based surfactants may also be used. Anionic surfactants may be used in order to attach ionic groups by adsorption of their linked hydrophobic groups onto carbon or other electrode material. These may be based upon permanent anions (sulfate, sulfonate, phosphate) or pH-dependent anions such as carboxylate. These include but are not limited to ammonium lauryl sulfate, sodium lauryl sulfate, alkyl ether sulfates: sodium laureth sulfate, also known as sodium lauryl ether sulfate, sodium myreth sulfate, dioctyl sodium sulfosuccinate, sulfonate fluorosurfactants, e.g., perfluorooctanesulfonate, perfluorobutanesulfonate, alkyl benzene sulfonates, alkyl aryl ether phosphate, alkyl ether phosphate, alkyl carboxylates, sodium stearate, sodium lauroyl sarcosinate, and fluorosurfactants, for example, perfluorononanoate (PFOA) or perfluorooctanoate (PFO).

Cationic surfactants may be used in order to attach ionic groups by adsorption of their linked hydrophobic groups onto carbon or other electrode material. Primary, secondary or tertiary amines, including pH dependently ionized amines may be used. Permanently charged quaternary ammonium cations are a preferred embodiment. Examples of cationic surfactants include but are not limited to octenidine dihydrochloride, alkyltrimethylammonium salts, cetyl trimethylammonium bromide (CTAB) a.k.a. hexadecyl trimethyl ammonium bromide, cetyl trimethylammonium chloride (CTAC), cetylpyridinium chloride (CPC), polyethoxylated tallow amine (POEA), benzalkonium chloride (BAC), Benzethonium chloride (BZT), 5-bromo-5-nitro-1,3-dioxane, dimethyldioctadecylammonium chloride, Dioctadecyldimethylammonium bromide (DODAB).

It is also conceivable that zwitterionic or mixed surfactants may be used on a particular electrode, where one of the ionic groups outweighs the other in amount or is more strongly ionized than the other.

The nature of adsorptive bonding of surfactants and other ionic group bearing molecules onto electrode pore surface area may be through Van Der Vals forces, or by Pi bonding through the hydrophobic adsorption attachment group, tail, or tether. These hydrophobic adsorptive moieties are in turn attached to the ionic group or groups, thereby linking these to the electrode or electrode material substrate. Surface attached ionic groups attached to carbon in this way were surprisingly durable. Carbon electrodes modified with surface attached ionic groups by this method maintained functionality after rinsing with water. Examples of modification of carbon by ionic surfactants are described in "Adsorption of Ionic Surfactants on Active Carbon Cloth" Ho Hung Hei Masters of Chemical Engineering Thesis, Hong Kong University, 2006, hereby incorporated for reference. The surfactants adsorb by their hydrophobic moieties in order to durably attach ionic groups to a capacitance carbon electrode surface. When derivatizing electrode materials with surfactants, for example, such as porous, high surface area forms of carbon, optionally, sub critical micelle concentration amounts of surfactants may be used so that large micelles do not form, thereby allowing the smaller individual surfactant molecules to better access and adsorb uniformly into the carbon pore structure. The optional addition of an electrolyte, such as for example 0.1M NaCl, may be added to the surfactant solution, in case the increased ionic strength lowers ion repulsion and helps increase the amount of adsorbed surfactant. The electrodes may be soaked with occasional stirring for hours or months, until satisfactory adsorption is achieved. However, there is no reason to think that the surfactants would not sufficiently adsorb, either immediately, or at least a lot sooner, within minutes, especially with continuous agitation or ultrasonic vibration to help get the molecules into the electrode material pores. An alternative method to derivatizing already formed electrodes with surface attached ionic groups, which takes advantage of better mass transfer in unconsolidated material, is to first derivatize the active electrode material, which may be in powdered, fibrous, granular or divided form, prior to forming these into electrodes together with binder components or other and integral electrode forming methods known to the art.

Ionic group bearing molecules may also be attached to the electrode surface area through ionic bonds. In this case, polyelectrolytes or ionic branched polymers may be adsorbed electrostatically to fixed charged groups of opposite polarity already present on or deliberately introduced on to the electrode surface for this purpose, as per any of the above oxidation or covalent modification methods. The ionic bonds so formed are weak, and this method is prone to polymer wash off. Therefore, to strengthen this bonding, care must be taken so that the opposing attachment groups on the electrode are attached in sufficient number so as to attach to multiple sites on the polyelectrolyte chain.

An additional advantage of the surfactant adsorption method is that it provides a ready means to attach ionic groups to a electrode surface by a tether. Tethers can also be attached directly to the electrode surface by covalent means.

Especially where macropores are present, it is beneficial for the contained ionic groups to influence as much of the electrode total pore volume possible. Accordingly, a preferred embodiment is the use of tethered ionic groups or ionophores. Tethered ions are held farther away from the carbon surface, thereby extending into more of the total pore volume space of the micro, meso, or macropores, and better filling the electrode material pore structure with the attached ions' electrostatic fields, and better excluding co-ions from the pore volume. The extra mobility of attached ions imparted by tethers may also help increase the ionic strength within the pore structure and thereby make the derivatized electrode less resistive and more conductive to the electrical transport of solute counter-ions. Where the tether or linker chain is long enough or branched enough to allow attached ionic groups to fill substantial amounts of the pore volume of the electrodes, for example attached ions filling over 50% of the total pore volume, of a composite electrode material, or electrode particle binder material formed into a sheet, Donnan exclusion may be enhanced, thereby helping increase coulombic efficiency, for example, to over 50%.

The length of the tether may be at least one or more linker atoms long, where the linker connects the ionic group to the electrode substrate, and may be composed of carbon containing molecules, including alkyl, ester, alkene, olefin, or aryl groups, and may also be composed of or include silica, phosphorous, or any other chain or polymer forming molecule or atom. If desired, shorter tether molecules may be selected for use with predominantly microporous electrode substrate materials, and the longer tether molecules may be selected for predominantly meso or macroporous electrode substrate materials. Alternatively, mixtures of different length tether molecules may be used for materials that have mixtures of pore sizes, to ensure that the smaller pores of internal pore structure do not exclude tethered ionic group molecules and the total material is therefore well infiltrated with ionic groups. Tethers may also be selected for their chain mobility and hydrophilicity, for example by incorporating oxygen groups, as a means to lower electrical series resistance.

It is important to note that adsorption as has been described herein is a continuum between weak physical adsorption and strong chemical adsorption, also known as physisorption and chemisorption. Therefore, adsorption is defined for the present purposes to include these processes and sorption in general. The amount of adsorption may be determined by the extent of solute removal from solution in a batch study. One protocol is to take a gram of electrode material substrate, also called the adsorbant, that you wish to attach molecules onto through adsorption. Place a known amount of the adsorbate, which is the ionic group containing solute molecule, into one liter of solution together with this electrode material substrate adsorbant. Allow to soak for a specified twenty four hour period at a specified twenty degrees centigrade. After this period, measure the final concentration of this solute remaining in the solution using an appropriate assay. The amount of this solute attached through adsorption may be determined as the difference between these concentrations. Algebraically, this is given by Equation 4 as follows:

$$\text{Amount adsorbed per unit mass of adsorbant} = q = (cf - ci)V_{solution}/m_{sorbent} \quad \text{Equation 4}$$

where cf is the concentration of solute remaining in solution after equilibrium with the adsorbate is established, ci is the initial concentration of solute in solution before exposure to adsorbate, both in moles per liter, and $V_{solution}$ are the liters of solute solution, and $m_{sorbent}$ is the mass of adsorbant. The above experiment may be performed at a series of increasing solute concentrations to obtain an adsorption isotherm.

For optimal performance of the polarized electrode flow through capacitor it is important for adsorbed or covalently attached ionic group molecules to remain robustly attached to the electrode material adsorbant. Adsorbed materials can in some cases reversibly desorb. Care must be taken to select molecules and any adsorption, covalent bonding, or other attachment methods which remain robustly attached and resist washing off. To test this, excess solution may be sucked from a sample of adsorbed electrode material adsorbant, either under vacuum or through centrifugation. A gram of this electrode material may next be equilibrated together with one liter of distilled water. After soaking for a specified twenty four hour period at twenty degrees centigrade to approximate equilibration, the water may be assayed to determine the concentration of adsorbed or attached ionic group molecule that has desorbed from the adsorbate electrode material. The amount of desorbed solute is calculated from this measured concentration and known volume. The amount of robustly attached ionic group molecule is the difference between the amount previously measured that had adsorbed from the adsorbing solute solution, and this amount measured that desorbs. Compounds that attach or adsorb irreversibly are a preferred embodiment. Such species are reported in the literature to remain over 80% adsorbed to activated carbon when washed with distilled water (Irreversible Adsorption of Phenolic Compounds to Activated Carbons. Terry Grant and C. Johnson King, Ph.D. Thesis, Applied Science Division, Lawrence Berkely Laboratory, December 1988.). For robust attachment, optimally, fifty percent or more, for example, over ninety five percent of the solute remains adsorbed or chemically bonded to the electrode material.

Another means to contain one or the other polarity of a particular ionic group within the electrode pores is to confine ionic group molecules by a blocking layer. Since adsorbed or chemically attached ionic group molecules may, unless specially selected or designed, desorb, be forced of by voltage gradients, un-attach, or leach out of the electrode over time, or when exposed to solvents or to similar organic molecules, an alternative method to confine the ionic group molecules within the pore volume structure is to cover the electrode flow spacer facing area with a ionic group blocking, protective layer, coating, film, or membrane. This blocking or protective layer may be identical with, and interchangeable with, materials that may also be used as protective layers useful to prevent electrode shorting, with the added constraint that the blocking layer is semipermeable, in the sense that is permeable to ions and solutes of purification interest, but at least partially, and preferably mostly impermeable to charge carrying ions or ionic group molecules infused within the electrode and its pore volume structure. One means by which the blocking layer may be impermeable to a charge carrying molecule is to provide a blocking layer with a lower molecular weight or size cut off than the molecular weight or size of the ionic group, ionic charge carrying molecule. The blocking layer can operate by size exclusion and be non selective as to the charge polarity of the ionic group molecules which it contains within the electrode pores. The blocking layer can be an electrically neutral, or weakly charged material, and therefore easy to fabricate without the swelling issues caused by charged groups. Ionic group molecules of any molecular size may be used. Smaller molecules, for example, under 100000 Daltons molecule weight, or under 1000 Daltons, may also be chosen in cases where lower molecular weight ionic group molecules are more weight per volume soluble, or, create less series resistance by imparting greater ionic conductivity to the electrolyte solution formed within the electrode pore volume. Larger molecules may be used in order that the molecular cut off of a particular blocking layer chosen is smaller than the molecular size. One way to achieve a specified molecular weight cut off is to have an appropriate amount of cross linking of the blocking or protective layer polymers. Molecular sieve materials may be used. Any material, coating, layer that is either intrinsically porous or made with a pore forming means to provide a molecular weight cut off below that of the ionic group molecule may be used. Pore forming methods include electron beam, differential dissolution of incorporated particles, sintering ceramic materials together with pore forming agents, and many others know to the art. Another type of blocking layer for use in this embodiment may be a flow spacer facing layer or coating on top of the usual electrode material comprised of conductive forms of carbon or conductive polymers that have molecular weight cut offs below the molecule weight of the ionic charge carrying molecule, such as nanotube mesh materials, or nano porous carbon, or carbon molecular sieve. Such conductive blocking materials may also provide additional capacitance.

By virtue of such a semipermeable blocking layer, chemical reactions are not required to confine or contain the ionic group molecules within the pore volume structure, thereby simplifying manufacture. The ionic group molecules contained within the electrode pore volume, in addition to being adsorbed or chemically attached to the pore volume surface, do not then need to be so attached and may instead be freely floating so as to form part of an ionic pair with the electrolyte within the pore volume solute. Therefore, in this case, the concentration of ionic group molecules is not constrained to how many molecules may be adsorbed or chemically attached to the pore volume surface. In prior art flow through capacitors, the electrolyte used within the electrodes is the same as that of the solution being treated. Because the desirable high capacitance on capacitor electrode surface area material increases, and undesirable series resistance decreases, with electrolyte concentration, the working feed solution electrolyte is seldom at an optimally high concentration. Therefore, a particular advantage of this embodiment is that a high concentration of ionic group molecule may be used to optimize high electrode capacitance and low electrical series resistance, and may be any concentration up to saturated, and may be past saturated to comprise a solid electrolyte solution. The ionic group molecules may be any ionic group molecules containing at least one pair of ions where one polarity of the pair of ions does not pass through the semipermeable blocking layer, and may include those ionic group molecules described in the other embodiments, including dendrimers, comb or brush polymers, polyelectrolytes, branched polymers, surfactants, organic or inorganic ions. As in the other embodiments where an ionic charge carrier conductive, non electronic charge carrier conductive protective layer is used, here the blocking layer also provides additional benefit to increase the parallel resistance and minimize short circuiting and current flow between oppositely charged electrodes.

An additional optional improvement is that any of the ionic molecules or groups contained within the pore volume or attached to the carbon may be replaced or supplemented by groups or molecules generally known as aptamers or ionophores to become biological molecule or ionic species selective. Ion species selective or ionophore groups are typically chelating agents, or coordination complexes or compounds, including cage like or tweezer like molecules that are selective or ion exchangers for particular ionic species. Ionophores may be similar to surfactants in that they may have a lipophillic or hydrophobic moiety that adsorbs, absorbs, or attaches into or onto a hydrophobic substrate, such as a membrane, or polymer. In this regard, an electrode surface, such as carbon, may be used as a substrate on which to adsorb ionophores, in similar fashion to how surfactants adsorb to such surfaces. Examples of ion species selective ionophores include ETH 5234, CAS number 126572-74-5 and A23187, CAS number 52665-69-7, Eniantin, CAS number 11113-62-5, crown ethers, macrocycles, antibiotics, and molecules sold under the trademark Selectophore™, by Sigma-Aldrich, tweezer like molecules such as BACA, (Anal. Chem. 2002, 74, 2603-2607), and carboranes described in U.S. Pat. No. 7,226,563 B2, herein incorporated by reference, In addition ionophore molecules specific to hydrogen ions such as Carbonyl cyanide-p-trifluoromethoxyphenylhydrazone may be used to concentrate or recover an acid solution from a less concentrated source of hydrogen ions or more neutral solution. Selective ionophores, for example ETH 5234, may be used to make the electrodes and polarized electrode flow through capacitors selective for calcium or other divalent ions for such applications as softening water in residential, industrial, municipal, cooling tower, or other uses, to remove calcium tartrate from fruit juices and wine, or to pretreat brackish or sea water feeds prior to a reverse osmosis or electrodialysis stages so as to remove foulants. Sodium selective ionophores may be used for purification of brackish waters for drinking and agriculture, in that case, leaving some or all of the calcium behind. Ionophores and aptamers work by selectively forming a coordination complex between the ionophore molecule and a selected ion species or molecule of interest. Ionophores may be used alone, or admixed with other ionic group molecules contained within the same electrode, in which case, preferably, the ionophore should be chosen so that the polarity of particular ions selected by the ionomers are opposite in polarity to the electrode contained ionic groups, so that the mobile ions selected by the ionomers correspond in polarity to the mobile counter ions selected for by the same electrode.

Capacitive charging is what allows electronic current to flow, and requires that flow though capacitor holds a charge voltage. This may be seen from the fact that the voltage of a charged polarized electrode flow through capacitor with high parallel resistance will remain above at least 1 volt for fifteen seconds or longer after being disconnected from a 1.2 volt power supply and voltage source. It is desirable to maximize high parallel resistance. This is because a low parallel resistance would allow short circuit electron leakage or current between the anode and cathode electrodes. Such electron leakage interferes with the capacitor charge holding ability to purify ions from solution, is an additional cause of poor coulombic efficiency, and is bad for energy efficiency and performance. An additional improvement is the use of ion permeable barriers or ion conductive coatings in order to reduce this electronic leakage, and to prevent conductive electrode or carbon particles washing off the electrodes, or falling into the flow spacer and causing short circuits leakage current, or eventual ablation of the electrodes. The optional protective material may incorporate or comprise materials described for use herein for use a blocking layers, and may be any coating, or layer, used on one, or on both of the electrode sides facing the flow spacer. Any ion permeable or conductive membrane, layers, or coatings useful for, spacing, preventing electrical leakage, or short circuits in electrochemical cells may be used for a protective material. The protective material may also be infiltrated into the electrode material and electrode material pores, or may serve a dual purpose as a binder that holds together the electrode materials or particles. There are many ways to form an ion conductive coating for use as a protective material. Small porous materials, for example, with an average pore size distribution of 100 microns or less, may be used as the protective material. Hydrogels may be used as the protective material. Examples of small porous coatings include materials commonly used as dialysis membranes, small or microporous polyurethane and other polymers, prepared through such methods as wet cast coagulation or salt dissolution process, PTFE or fluorocarbon materials, UV beam polymerized microporous films, or a small or micro porous pseudoboehmite layer described in (U.S. Pat. No. 6,277,514 B1) herein incorporated by reference. Any small porous, microporous, or meso porous ceramic or polymer layers may be used as the protective material, which may be either hydrophobic or hydrophilic, for example, an ultrafiltration, reverse osmosis, thin film nanocomposite, or microfiltration membrane. Alternatively, the protective material may be a hydrophilic, non porous ionically conductive material, for example any polymer or gel, inorganic gel or organogel with polar groups such as alcohol, ketone, aldehyde, or carboxylic groups. Coatings used as medical adhesives, for EKG electrodes, and in the medical device industry to make substrates hydrophilic may be used as the protective material. Examples of polymers that may be used include polyacrylamide, polyethylene glycol, polyvinyl chloride, polyacrylate, carboxymethyl cellulose, hydrophilic polyurethanes, methyl vinyl ether-maleic anhydride copolymer, isobutylene-maleic anhydride copolymer, segmented copolymers of polyester or polyether, and polyurethanes with polyethylene oxide, polyethylene oxide, polyvinyl pyrolidone, ethylene acrylic acid, oxidized ultrahigh molecular weight polyethylene, or hydrophilic polyesters to which polyether groups have been added to limit swelling. Such polymers or materials may be used alone or in mixtures. The polymer protective layers may preferably be cross linked to limit swelling, for example, to less than 200% volume increase. Examples and methods of cross linked hydrogels may be found in the following patents, herein incorporated by reference, U.S. Pat. Nos. 4,777,954, 5,800,685, 3,499,862, porous or macroporous polymers such as described for example in U.S. Pat. Nos. 6,201,089 and 4,298,002, and, but not limited to, the formation of thin hydrogel layers as laminates described for example in U.S. Pat. Nos. 4,298,002, and 5,846,214. Solid polymer electrolytes may also be used, for example, as described in U.S. Pat. No. 5,337,184, or in the book, Solid Polymer Electrolytes, 1991, by Fiona M. Gray, ISBN 3-527-27925-3, herein incorporated by reference. Copolymers of polyether and polyurethane may also be used described in U.S. Pat. No. 6,680,149, all herein incorporated by reference. Reticulated forms made from urethane and other polymers, alone or coated with hydrophilic materials as in U.S. Pat. No. 6,617,014 B1, herein incorporated by reference, may also be used. The polymers or hydrogel or gel forming molecules used for the optional protective material are preferably cross linked so as to optimize ion conductivity while limiting swelling and increasing mechanical strength so that the coatings do not dissolve, break during manufacture, or extrude under compression into the flow spacer and cause a blockage to fluid flow. Unlike the prior art, the protective material, either in the form of a binder, infiltrated material, layer, or coating, only need be ion conducting, or hydrophilic, or a hydrogel coating, without added need or expense for this to be selective to ions or to contain fixed permanently charged ionic groups of the prior art. However, if desired for additional performance on top of that provided by the ionized ionic groups contained within the electrodes the protective material may optionally consist of the ion selective charge barrier layers, coatings, membranes, or infiltrated materials described in the prior art charge barrier flow through capacitor (Andelman U.S. Pat. No. 6,709,560), herein incorporated by reference, for example any positive or negative ion exchange membranes, including polymer membranes derivatized with sulfate, sulfonic acid, tertiary or quaternary amines.

A capacitance electrode material useful as a substrate on which to attach ionic groups needs to be electrically conductive, and porous in order to achieve high surface area necessary for capacitance. Optimal internal surface areas for capacitive electrode materials are over 300 square meters per gram B.E.T. (Brunner Edward Teller method), for example, over one thousand square meters per gram B.E.T., or, a high iodine number, for example, up to 3000 milligrams/gram.

Electrode materials known to the art that is used for so called "double layer" type capacitors may be used. Such electrode materials typically include various carbonaceous materials commonly used for double layer capacitors. Because capacitance increases with surface area, these include surface area carbon and activated carbon. Deyang Qu and Hang Shi, Journal of Power Sources 74(1998) 99-107 provide a partial list of such materials in their table 1, herein incorporated by reference. Carbon Aerogel, alkali, steam, phosphoric acid, or other activated carbon, coconut shell carbon, and non carbon capacitance containing material may be used alone or in combination with each other or carbon, including ceramics or conductive polymers. Controlled porous carbon materials, such as but not limited to activated carbon cryogel as disclosed in U.S. Pat. No. 7,835,136 B2, herein incorporated by reference, or nanoporous carbons made from removing non carbon materials from carbides may be used in order to provide electrodes with a narrow pore distribution in the nano, micro, or meso pore range. Various forms of high surface area graphite, nanotubes, nanotube membranes, ionic group functionalized nanotubes, nanohorns, carbon nano-networks, carbon microflakes, edge plane carbons, graphene materials including as described in U.S. Pat. Nos. 7,704,479 B2, 7,209,341 B2, 7,211,321 B1, 6,491,789, 7,067,096, and 7,209,341, herein incorporated by reference, may be used. Where these are intrinsically more conductive, for example as compared to activated amorphous carbon electrode materials, they may be used with or without an optional current collector. Carbon materials formed into small particles jet milled down to less than 100 microns, carbon black, lamp black, glassy carbon, nanoporous carbon, or combinations within a particular carbon or mixture of carbons containing larger and smaller pores together where the larger pores provide pathways for ions and access to smaller pores into the depth of the electrode material, may be used. Sometimes mixtures of materials are used, for example, carbon black is added in a smaller amount to enhance conductivity, or a small particle size material is used to fill in between the larger pores formed by larger particle material and thereby decrease the average pore size and enhance the volumetric capacitance of the resulting composite electrode.

Because the porous capacitance materials have a large pore volume surface area, when these materials are fabricated into flat electrode sheets, the electrodes contain tens or hundreds of thousands of square meters pore volume surface area per the facial square meter area of electrode sheet material, for example, over a fifty thousand square meters B.E.T. of microscopic pore surface area per facial square meter area of electrode sheet material. This high surface area is conducive to a high limiting current density fast purification flow rate. The combination of high surface area, for example 300 or more square meters per gram, on both polarities of electrodes is a feature of the polarized electrode flow through capacitor. This high surface area has the benefit to achieve high capacitance, for example, when measured for testing purposes in a standard 35,000 ppm NaCl electrolyte, the high surface area, high capacitance electrodes optimally have single electrode capacitances, in terms of ions adsorbed, of over 20 farads per gram, for example, over 70 farads per gram electrode dry weight. The polarized electrode flow through capacitor cell itself optimally has a total capacitance, in terms of ions adsorbed, of over 10 farad per gram electrode dry weight, for example, over 30 farads per gram dry weight. Total capacitance is the total series capacitance of the cell, anode and cathode capacitance included.

A high electrical series resistance causes low flow rate utilization and makes it difficult to discharge concentrate during the concentration cycle. During the purification cycle, this remaining, not fully discharged concentrate from the concentration cycle mixes together with the water being purified during the subsequent purification cycle, thereby causing additional coulombic inefficiency. Therefore there is an additional need for a polarized electrode flow through capacitor and electrode that operates with improved flow speed performance. This enables the flow through capacitor and electrodes to discharge the concentrate within a relatively fast period of time, for example, 30 minutes or less, and to subsequently efficiently purify, or reduce the concentration of, a feed solution containing dissolved ions in a purification cycle of 60 minutes or less, for example 30 minutes or less. Alternatively, or in addition the flow capability while removing 90% of the conductivity from a 0.01 M NaCl aqueous test feed solution, at the time of peak purification, should be greater than two cell volumes per hour. Such flow through capacitor designs utilize a space saving multiple layer, thin layer, low electrical series resistance materials, high volumetric capacitance cell design. Low electrical series resistance necessary for the fast flow rate design is achieved by using current collectors that match or cover the facing area of the electrode in order to provide optimum contact area with which to distribute the current, along with the use of double sided internal electrodes to better utilize current collector and further save space. The flat current collectors and electrodes may also be integrated together into a single structure, such as by coating, bonding, gluing, or sintering them together. Alternatively, in place of a flat sheet current collector, conductive fibers, foam materials, or forms of graphite, and electrochemically inert materials may be used to distribute current into the facing area of the electrodes. Aforementioned intrinsically conductive electrodes may also be used without an optional current collector. Conductivity may be imparted to the electrodes by mixing these and other forms of graphite, other inert conductive materials, in particle, fiber or powder form, throughout the electrode material volume or area in order to form intrinsically conductive electrodes, for use with or without an optional current collector. Due to low electrical series resistance, the purification cycle is able to be 30 minutes or less for a single charge purification cycle, and flow rates are greater than two cell volumes per hour. Preferably the flow through capacitor cell should have a electrical series resistance as measured across the terminals of less than 100 ohms cm2, for example less than 50 ohms cm2.

It has also been discovered that most, for example, 75% or higher, of the useable capacitance is in the top 2 millimeters of the electrode, and that the rest of the electrode thickness is less useable capacitance, which causes a dead volume pore space, wasted materials and cost, and added electrical series resistance. Useable capacitance means that capacitance which is utilized within an at most 30 minute purification cycle time frame. Within this dead volume pore space there exists a dead volume of solution, which may be at any particular time either feed, waste, or purified solution, not being acted upon by capacitance to the same speed and extent as the top 2 millimeters of electrode. This dead volume mixes with the water being purified or concentrated by the capacitor, resulting in coulombic inefficiency, causing poor water recovery and increased energy usage. Use of a thin electrode avoids this detrimental dead volume that occurs in thick electrodes. Therefore, optimally for the low electrical series resistance, high flow rate, high cycle time, coulombic efficiency, the electrodes are 2 millimeters thick or less, preferably 1 millimeter thick or less.

An additional need exists to provide roll goods for easier manufacturing. Accordingly, the more coulomb efficient electrode may be integrally attached to either or both of the current collector or flow spacer, either of which could be in various form of flat materials such as film, foil, layer, web, netting, or screen. The current collector may be a separate flat graphite or other conductive sheet, or may be contiguous particles, fibers, or pieces of graphite or other conductive material homogeneously mixed together into the electrode material itself in order to form a composite conductive enough to serve as both an electrode and a current collector. Roll goods made from these materials with a tensile strength of 50 kPa or better may subsequently be used with robotic or automated manufacturing equipment to inexpensively manufacture flow through capacitor cells. Electrodes may be physically, or chemically bonded into a low electrical series resistance electrical contact on top of or on both sides of the current collector by virtue of forming as a coating on a current collector substrate. Alternatively, the electrodes may be mechanically bonded into a low electrical series resistance compression contact formed by compression of the electrode stack comprising electrode, flow spacer, and current collector layers. In this way, the electrode is held under compression against the current collector by the flow spacer. Therefore, the flow spacer has to be rigid enough, for example with a Young's modulus of 0.05 GPa or higher, so as not to collapse under compression and restrict the flow.

Ionic group derivitized electrode particles, due to their ionic nature, disperse better, are more hydrophilic, and are therefore easier to work with in processes for the manufacture of electrode sheet materials. Therefore, an additional advantage is that, once derivatized, electrode particles, fibers, or pieces, may subsequently be directly formulated into separate anion and cation responsive electrodes by any process known to the art for the production of composite sheet materials. These particles may be used together with any binder means or process known to the art of forming sheet materials or coatings out of powders, fibers, or particles, or any method known to the art that adheres a uniform layer of particles to a substrate sheet material. Some but by no means all of these binder materials and processes herein incorporated by reference, are described in US2005/0285080 A1, U.S. Pat. Nos. 2,378,025, 4,152,661, 4,354,958, 4,382,875, 4,862,328, 5,277,729, 5,313,884, 6,383,427 B2, 7,208,341 B2, 7,471,542B2, 7,352,558 B2, US 2007/0247788 A1, US 2003/0027051 A1, and U.S. Pat. No. 6,773,468 B2. Some of these binders may include but are not limited to flouropolymers, latex, acrylic, Kynar 2801, or any other polymeric, adhesive, sintered material binder, unsaturated polyurethanes, acrylics, latex materials, polymers forming an interpenetrating network, polyols, fluoropolymers such as P.T.F.E, thermoplastics, sinterable resins, or cross liked polymers such hydroxyl alkyl polysaccharides, polyvinyl alcohol, polyglycidol, or deriviatives and mixtures of the above. Any surface area, carbon powder or capacitive material known to the art of capacitor electrodes can first be derivatized with ionic groups, and then formed into electrodes by any means known to the art of making composite particle-binder sheet materials, in particular capacitor or battery electrodes. Sheet forming processes used may include mixing and fibrillating PTFE, or UHMWPE, and carbon powder together into electrodes. Electrode binder mixtures may be painted, electro coated, slurry, or blade coated onto various substrates such as graphite foil or other current collectors. U.S. Pat. No. 6,804,108 B2 discloses slurry coating processes useful to form coated electrodes using the derivatized carbons. Spray or atomization processes including those described US 2005/0244644 A1 may be used to deposit a controlled, even coating or carbon electrode material onto substrates or current collectors such as graphite foil. Electrodes may be thermoformed, extruded sintered, or molded. Electrode particles may be mixed together with fibers in order to form electrode sheets in paper making and web handling equipment. These sheet forming methods may include any capacitor, battery, lithium ion battery, fuel cell electrode, or ceramic green sheet forming method including coating, slurry, calendering, spraying, printing, or extruding means or process. Preferably, any such electrodes should be hydrophilic to the extent that they will adsorb water, or which have a contact angle of less than 90 degrees as measured for example by either the Powder Contact Angle Method or the Sessile Drop Technique. Carbon materials derivatized with ionic groups are easier to use with environmentally better aqueous based binders or other ingredients and easier to disperse for use in any process which is use to form electrodes by the aforementioned processes. For example, the electrode materials may be put into single screw, twin screw, or other extruders, or calendars, to form flat sheet electrodes. Alternatively, the carbon materials derivatized with ionic groups may be formulated into inks and printed onto either current collector or flow spacer substrates, either to form traditional flat electrodes, or, to form the electrode array described in U.S. Pat. No. 7,368,191, herein incorporated by reference, which uses an electrically insulating spacer between thin electrode strips arrayed on a planar surface. Flow spacers may be a woven or non woven materials, bi-planar filtration netting, or a flow space formed by microprotrusions, ribs, or ridges printed on the electrodes or formed into any blocking or protective layers. Flow spacers or flow spacer materials should be electrically insulating and ionically conductive.

The polarized electrode flow through capacitors may be in any flow through capacitor geometry of the prior art, including flat stacks with central holes and spiral wound cells. The electrode may be used to form spiral wound flow through capacitor cells without the added cost or need to align a charge barrier layer. Another way to wind a spiral wound cell is to utilize a double sided internal electrode, with single sided electrodes disposed upon either side. Flow spacers would be placed in between the internal double sided electrode and each of the single sided electrodes. Each of the two single sided electrodes would have a flexible current collector, such as graphite foil, disposed upon the surface opposite to the flow spacer. When rolled in a spiral fashion, the flexible current collectors would be pressed, glued, or laminated together in order to electrically connect the single sided electrodes to form either an anode or a cathode. In any spiral wound flow through capacitor, the current collectors can extend beyond the electrode out either end of the winding, so as to form current collector electrical leads. Where delamination due to differential movement between a coated electrode and a current collector is a problem, the electrode may be coated onto a current collector in sections separated by thin transverse linear gaps designed to prevent any delamination causing stresses between current collectors and electrodes when rolling the material into a spiral wound cell. Spirally wound flow through capacitors ease manufacture through use of roll goods fed off of spools and automatically rolled together with any additional interleaving spacer or current collector layers. Spiral wound cells also easily fit into tubular cartridge holders. Tubular cartridge holders are an ideal pressure vessel that may be formed from standard, inexpensive, parts such as plastic pipe. Optimally, these roll goods may be used to make flow through capacitors in spiral wound form by winding around a central spindle which may be later filled in or sealed. As an optional detail, the electrode material coated on or against the current collector on the first inner winding spacer facing part of the inner electrode, and on the last outer winding of the cartridge holder facing part of the cation or anion responsive electrodes may be omitted, or replaced with a flexible polymer or easily sealed material, so that only those portions of the electrodes that face each other in the spiral winding are double sided electrodes. The outer circumference of the spiral wound cell may be sealed inside a cartridge holder so that both the exterior and the interior winding are sealed against fluid flow, so that fluid flow is directed end to end through the spiral wound stack to be directed to an outlet in the cartridge holder. Alternatively, the outer circumference of the spiral stack is not sealed, and fluid flow is directed in spiral fashion in a radial direction towards the center of the winding, where it enters openings into the central spindle. The central spindle may serve as an outlet which may extend through, or be pressure sealed against the outlet of a cartridge holder. The flow may also be directed through the facing areas of the porous electrode layers themselves, to travel between electrode particles, in which case better mass transfer between solutes and capacitive adsorption electrodes may occur. In this case, the current collector may also be provided with transverse pores or flow openings. An example of a spiral wound polarized electrode flow through capacitor cell and cartridge holder is shown in FIG. 1.

Flow through capacitors made from activated carbon, carbon black, high surface area graphitic carbon, other capacitance carbon materials, and other non carbon conductive capacitive materials have a problem when these materials are used with the objective to purify, concentrate, resolve, or isolate organic or biological molecules from solutes, water or mixtures, in that the surface area materials useful for capacitors generally are also good adsorbents for organic and biological or other molecules with hydrophobic moieties. This same tendency to adsorb organics also leads to fouling of electrodes due to organic components in the feed water, for example reported by Lai Yoke Lee, How Yong Ng et al. water research 43 (2009) pages 4769-4777. Organic fouling increases the electrical series resistance of electrodes and thereby reduced flow speed. An additional application where such passive adsorption is undesirable is the use of the flow through capacitor to concentrate and purify organic or biological molecules, for example, biotechnology products, fermentation products, amino acids, vitamins, proteins, DNA, RNA, or carbohydrates, for use as therapeutics, diagnostics, or for biomedical research purposes. Therefore a further need exists for a flow through capacitor where passive adsorption is limited in order to allow electrically reversible release and capacitive purification of these molecules. Accordingly treatment of the electrode materials with attached ionic groups lessens or eliminates passive adsorption of some organic or biological molecules to the extent that the electrodes become less sticky to these. Therefore reversible removal and concentration of organic and biological molecules, viruses, bacteria, and cells from solution may take place by electrostatic means through capacitive charging or discharging of the polarized electrode flow through capacitor.

In cases where biological, biofilm, organic, or inorganic molecules cause fouling of the electrode, this may be prevented by incorporation of a suitable pretreatment, such as scavenging adsorbent upstream of the polarized electrode flow through capacitor. This scavenging adsorbent may for example be a mixed bed ion exchange resin, with different polarity groups, which any such problem molecules may stick onto, to protect the downstream working electrodes. Pretreatment or post treatment may be used to remove organics, microbes, or particles and may for example include carbon filtration, mixed bed filtration, microfiltration, ultrafiltration, nanofiltration, a reverse osmosis or electrodialysis device, flocculation, sand filtration, ultrafiltration, pH adjustment, UV light, electrolysis, or ozone generation means, or any other water treatment method alone or in combination.

Figure 2:
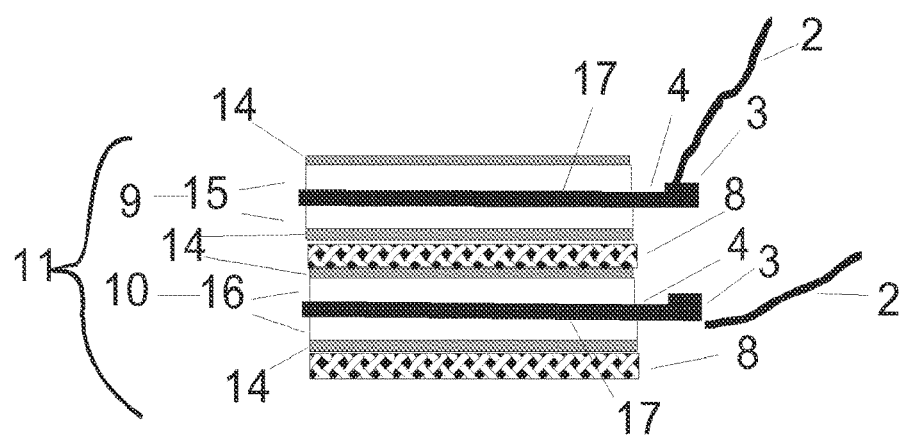
FIG. 2 is a cross sectional view of arrangement of flow through capacitor materials in opposing sheet geometries such as stacked layer or spiral wound.
Figure 3:
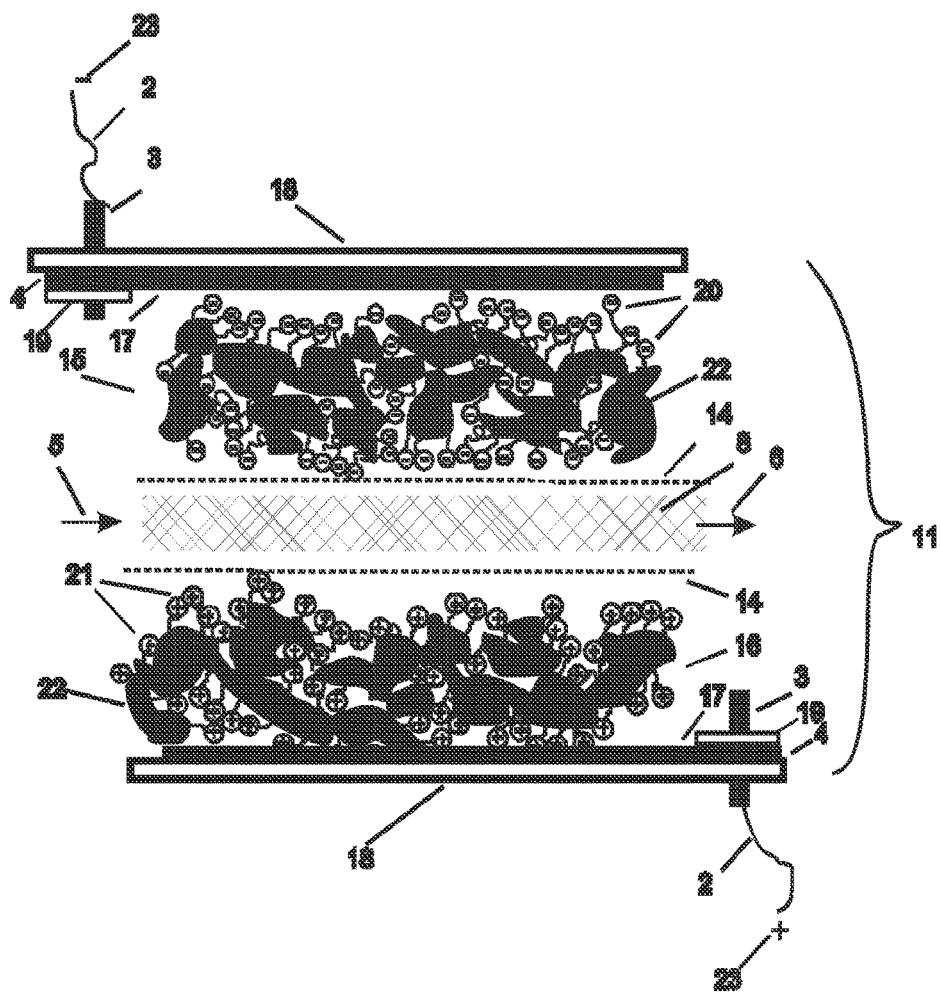
FIG. 3 illustrates an arrangement of electrodes, current collectors, and flow spacers.

Cells and electrodes of the polarized electrode flow through capacitor, when connected in parallel, are typically charged to a DC voltage of 2-3 volts or less, for example 1.2 Volts. However, these same electrodes and polarized electrode flow through capacitors may also be connected in series for higher additive voltages, up to for example 48 volts or more, where the individual cells are charged to 2.5 volts or less. Ordinary cells, such as shown in FIGS. 1, 2, and 3 have multiple parallel connected leads bundled together into two opposite polarities. One set of leads connects to the anion responsive, and another set to the electrode responsive electrode facing current collectors. A series connection is formed by connecting the opposing polarity bundled leads or lead connected wires together. An alternative series connection method is called a true series cell, where the series connection is inside the cell, shown in FIG. 11, In true series cells electrodes of opposite electric polarity, containing opposite polarity ionic groups, are used on each side of the current collector instead of using the same polarity, as in U.S. Pat. No. 6,628,505 herein incorporated by reference. In a true series cell, because the total stack voltage can be higher than the Nernst potential for the breakdown of water, the fluid path between cells needs to be sufficiently resistive to provide electrical isolation and limit electrolysis. In either kind of series cell, it is important to match the uniformity of flow, pressure drop, capacitance and resistance of the individual series cells or cell layers so as to maintain electrical balance. Series cells may be stacks of flat materials, or spiral wound. Individual cells may be built within a common housing and share a common compression under common end plates as a means to enhance cell uniformity required for good electrical balance. Tube shaped series cells may be made from bending together into nested concentric circles matched capacitance layers, or by rolling together or spiral winding of flat stacks of capacitance matched layers.

The DC current applied through leads to charge the flow through capacitor is reversible in polarity by use of mechanical or electronic relays, an H bridge, or switching means, controlled by timer or ion sensor or conductivity means together with a programmable logic controller, computer, or microprocessor means. The flow through capacitor may also be controlled in one polarity, for example to adsorb or purify ions in the positive polarity as a volume of purified water in the effluent, with alternating shunt cycles to desorb or release ions as a volume of concentrate in the effluent. A shunt, which may be accomplished by a mechanical or electronic relay, short circuits the capacitor electrodes together to zero or intermediate voltage. The shunt may be used in single polarity operation, or, may be used between reverse polarity charging, and requires less energy than a polarity reversal from charged electrodes. The attached ionic group electrodes are also able to release electrostatically adsorbed ions with a shunt. This allows efficient reversible capacitive adsorption and desorption of ions. Alternatively, alternating cycles of polarity reversals may also be utilized in order to either purify or concentrate ions. A valve may be used to select out the particular segment of ion purified solution or ion concentrated solution in order to direct this to a product or waste water outlet.

FIG. 1. Depicts a spiral wound polarized electrode inside a cartridge holder depicted by a cut away view. The cartridge holder 1 may be any fluid tight container used to establish a pressure difference between the feed solution inlet 5 in relation to the outlet 6. The sealing means 7 directs the flow of fluid along or through the flow spacer 8, either end to end through the cell 11, radially in spiral fashion alongside or radially through the electrodes 9 and 10, and or out through the central support, flow tube, or mandrel 12. The central support flow tube, or mandrel 12 may be used to wind the double sided electrodes 9 and 10 on either side of flow spacer 8, to form a spiral wound flow through capacitor 11. The double sided electrodes 9 and 10 may each sandwich an electrochemical corrosion resistant conductive current collector, not shown here but shown as 17 in other figures, such as graphite foil or, electrodes enhanced in conductivity may be used without a current collector, for example by combination with a more conductive material such as graphite fiber and used per se. The flow space or spacer 8 electrically spaces apart and provides a flow conduit between the electrodes 9 and 10. The optional through holes 13 in central support, flow tube, or mandrel 12 may be used to direct flow through outlet 6 of cartridge holder 1. Wire leads or bus bars 2 may be attached to current collector tabs 4 by fastener means 3 and may be designed to handle high amperage current, for example, over 10 amps. The fluid inlet 5 and fluid outlet 6 may be reversed in' order to back wash the flow through capacitor 11.

FIG. 2. Depicts the relative placement of materials in the polarized electrode flow through capacitor. An optional protective or blocking material layer 14 may be used to prevent electrode short circuits, or to provide containment for any unattached ionic group molecules, and may be chosen from any ionically conductive, electrically insulating material, including ionic conductors, hydrogels. The cation responsive electrode 15 is a capacitive electrode with contained anionic groups. The anion responsive electrode 16 is a capacitive electrode with contained cationic groups. The double sided electrodes 9 and 10 are formed from a sandwich of the cation responsive electrodes 15 on either side of current collector 17, and the anion responsive electrodes 16 on either side of current collector 17. The current collector 17 may be any inert, conductive material, such as graphite foil, titanium, foil, and aluminum or other metals covered with a conductive passivating layer such as carbon filled vinyl, other carbon filled polymers, or conductive metal foils laminated on one or two sides with graphite foil, conductive vinyl, or other electrochemically protective layers. The flow space or spacer 8 electrically spaces apart and provides a flow conduit between the double sided electrodes 9 and 10. The electrode assembly consisting of these electrodes, graphite foil, and flow spacers form a flow through capacitor 11 cell.

FIG. 3 depicts a view of an electrode assembly with their contained ionic groups. The optional end plates 18 may be used to form a fluid tight seal against end current collectors or electrodes for flat stacked flow through capacitor cells. Flat surface metallic or electrochemically inert conductor 1.9 together with fastener means 3 may be used to provide additional conductive surface area to form low electrical series resistance electrical contacts to current collector tabs 4 and wire leads 2. It is desirable to maximize this surface area in order to provide optimum electrical contact. This may be done by bundling multiple tabs, or by extending the entire edge of current collector 17 beyond the other cell material for use for tabs 4. This may be done in either flat stack or spiral wound cell configurations. Anionic groups 20 and cationic groups 21 are adsorbed or attached to the surface area porous capacitive electrode substrate 22. These groups may also be or include ion selective ionophores, chelating, or complexing agents. DC current 23 supplied from a power supply (not shown) through electrical leads 2 is typically 2-3 volts or less for parallel cells, or may be multiples of this where parallel cells are connected in series, or where cells are of true series design. Shown in FIG. 3 is a depiction of the positive to negative polarity configuration of the DC current for purification of ionic substances from a feed stream flowing through the flow space or spacer 8. FIG. 3 shows for illustration purposes a pair of single oppositely polarized electrodes, a cation responsive electrode 15, and an anion responsive electrode 16, facing each other on opposite sides of a flow spacer 8. However, when building a cell stack comprising multiple layers of materials, the cation responsive type of electrodes 15 and anion responsive type of electrodes 16 are more typically stacked in multiple repeating layers where the inner stack electrodes of each electrode polarity type are double sided with respect to the current collectors 17. Only the outer end electrodes may more typically be single sided, as shown here, with the end electrodes facing the flow space or spacer 8. Alternatively, a flow through capacitor cell 11 with layers exactly as shown could be wound in spiral fashion to form the basis for a spiral wound cell with single sided electrodes. In this case, end plate 18 would be a thin, flexible polymeric, electrically insulating material. When rolled into a spiral, this flexible material can optionally form a back to back layer that is laminated together, glued, or compression sealed against itself.

Figure 4:
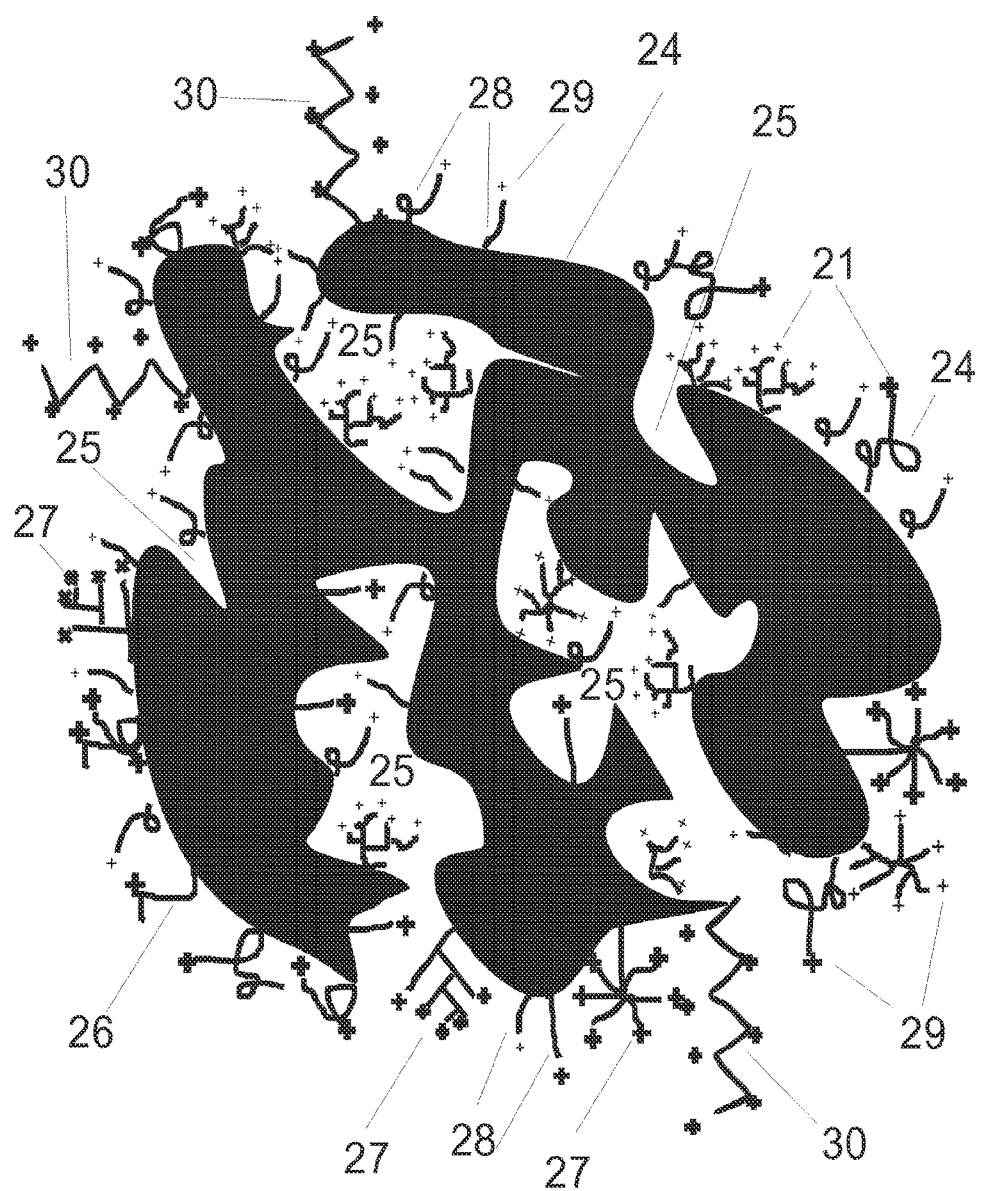
FIG. 4 depicts a single particle of conductive capacitor material derivatized with ionic groups.

FIG. 4 depicts a surface area capacitive material substrate in the form of an individual particle, fiber, or piece of capacitance material 24, for use in a composite electrode material and as a substrate to attach ionic groups. Shown in this case are attached cationic groups 21 in order to form anion responsive electrodes 16 shown in other figures, but these groups may also be anionic groups to form the cation responsive electrodes 15. The surface area providing pores 25 may be a nano, micro, meso or macropore, and provide the capacitance needed for the flow through capacitor to electrostatically adsorb ionic substances from solutes. Individual ionic groups and or ionophores attached to polymers, surfactants, or linking means 29 are shown here for illustration purposes as positively charged, anion responsive, contained cationic groups. For use in cation responsive electrodes, these contained groups would be negatively charged, anionic in nature. Also shown is tether means 26, attached dendritic, branched, brush, or multiple group ionic polymer, surfactant, or ionophore 27, attached single group ionic polymer, ionophore, or surfactant 28, and attached polyelectrolytes or polyionic surfactants 30.

Figure 5:
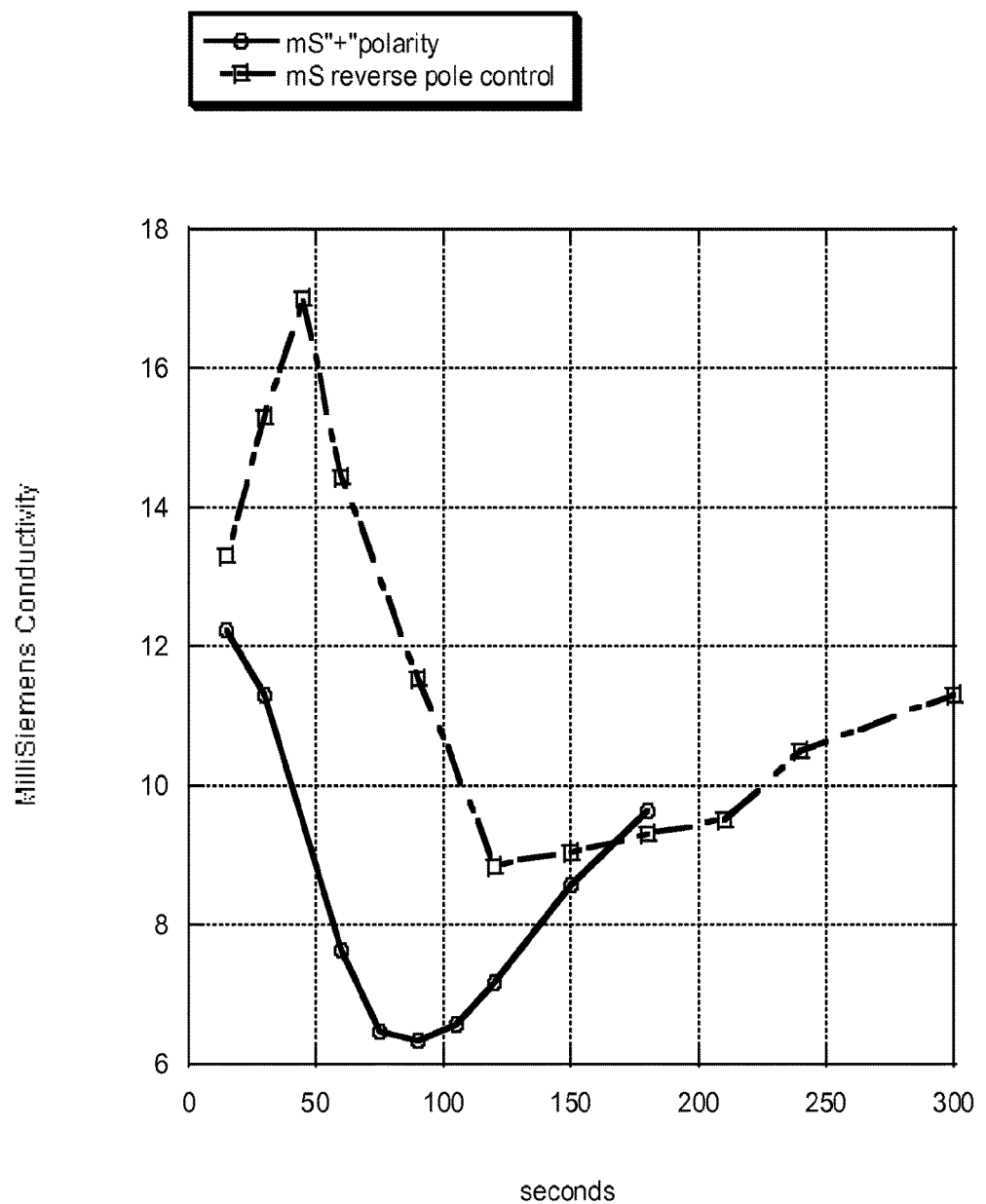
FIG. 5 is a graph showing positive and negative polarity treatment of ion-containing water (in this case pH 7, 0.1 M NaCl) at 1.2 DC volts with a polarized electrode flow through capacitor.

FIG. 5. Data showing the performance of the cell described in Example 1 at a flow rate of 20 milliliters per minute of pH 7, using an aqueous feed solution of 0.1M NaCl. The degree of solute purification or concentration was measured in conductivity as milliSiemens during a period of 300 seconds time. The pH of the effluent purified product, and concentrated waste streams, did not vary in this example significantly, for example, less than 1 pH unit. The bottom, solid curve is the performance of the cell when DC voltage, in this case 1.2 volts, is hooked up in the positive polarity, namely, with the positive terminal attached to the anion responsive electrodes, the ones with the attached cationic groups (16 in FIGS. 2 and 3), and the negative terminal is attached to the cation responsive electrode, the ones with the attached anionic groups (15 in FIGS. 2 and 3). The top, dotted line curve is the performance of the cell when the same DC voltage is hooked up oppositely to the above, in negative polarity, namely, with the positive voltage attached to the cation responsive electrode, and the negative terminal is attached to the anion responsive electrode.

Under positive polarity, the polarized electrode flow through capacitor purified water to a greater extent from its initial conductivity compared to the same flow through capacitor operated the same way except that the electrodes were connected to the negative polarity. The coulombic efficiency in this particular example, under the positive polarity conditions, was calculated at 74% by integrating the coulombs of electrons versus time measured as current, and the coulombs of ions purified over time, using Faraday's constant together with NIST standardized conductivity measurements. This gave a measured sodium chloride amount removed in one run of $1.8 \times 10^{-4}$ equivalents per gram of carbon electrode material. The total measured capacitance, in terms of ions adsorbed, was 14.5 Farads per gram of electrode material. The total capacitance on an electron basis measured was 21.2 Farads per gram of electrode material. When the polarity is reversed to negative polarity whereby the electron current is hooked up to the anion responsive attached cation electrode, and the positive hole carrying electronic current is hooked up to the cation responsive attached anion electrode, the water either concentrated, stayed more or less the same, or did not reduce in concentration as much as when the positive polarity was applied, shown by the dashed top line of FIG. 5. As also explained above, this differential purification behavior with polarity is diagnostic of the polarized electrode flow through capacitor. This differential purification behavior with polarity is a consequence of the electrodes derivatized with ionic groups being polarized, in the sense that anions are differentially attracted to the anion responsive electrode, and cations are differentially attracted to the cation responsive electrode, to a greater degree in positive polarity than when the polarity is negative. In comparison, a scientific control, flow through capacitor which uses electrodes without the added attached ionic groups, shows little or no difference in behavior upon a polarity reversal starting from a shunt.

Figure 6:
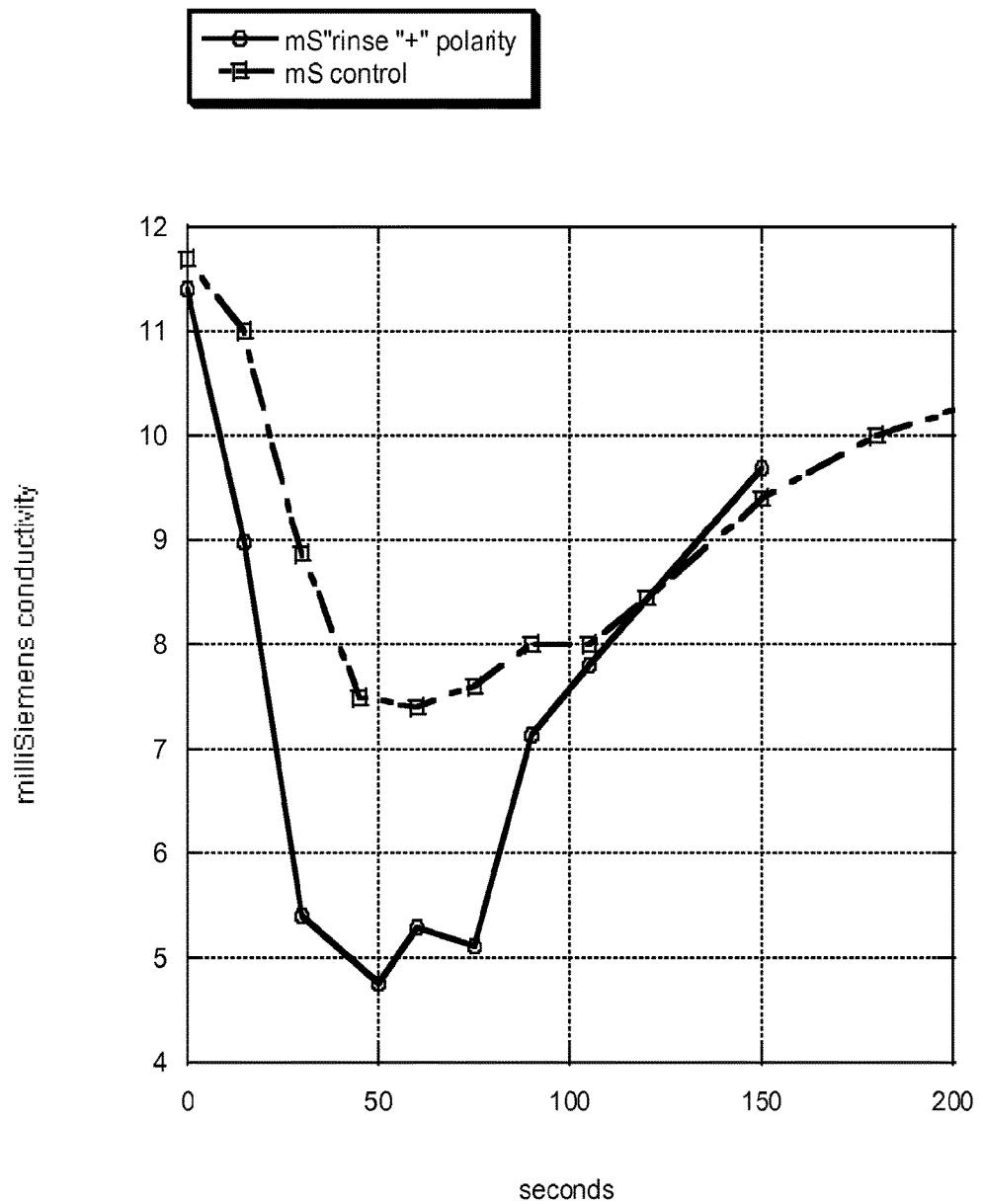
FIG. 6 is a graph showing a comparison of a polarized electrode flow through capacitor to a scientific control flow through capacitor.

FIG. 6. Data showing the performance of the cell of Example 1, operated by initially rinsing with feed while under shut to zero volts to equilibrate the outlet to the inlet feed concentration, then subsequently tested at 1.2 volts at a flow rate of 20 milliliters per minute. The feed was a pH 7, 0.1 M NaCl aqueous solution, the outlet purification or concentration of total dissolved solids in the water was monitored as conductivity in milliSiemens over time, and compared to an identically operated, scientific control, flow through capacitor using the same carbon electrodes without added attached ionic groups or charge barrier. The bottom solid line is the result according to polarized electrode flow through capacitor, and the top dashed line is the control. According to the data in FIG. 6, a polarized electrode flow through capacitor has a deeper purification curve compared to an identically operated, scientific control, flow through capacitor using the same carbon electrodes without added attached ionic groups or charge barrier. Therefore, the polarized electrode flow through capacitor purifies at a faster rate, purifies a greater amount of total ions, compared to the scientific control. This result is due to increased coulombic efficiency compared to the scientific control. The conductivity data in this figure shows that, as the capacitance charge holding ability of the electrodes is used up, the amount of ions removed from solution decrease over the charge cycle. Therefore, the conductivity of the purified solute slows over the time of the charge cycle and reaches over 50% of the initial feed conductivity value, in this case over 80% of initial feed conductivity at one hundred and fifty seconds into the charge cycle, and over 90% at ten minutes or less. The flow rate on a weight basis of electrode material that was utilized in the flow through capacitor of this example was over 1 milliliter per minute per gram of electrode material.

Figure 7:
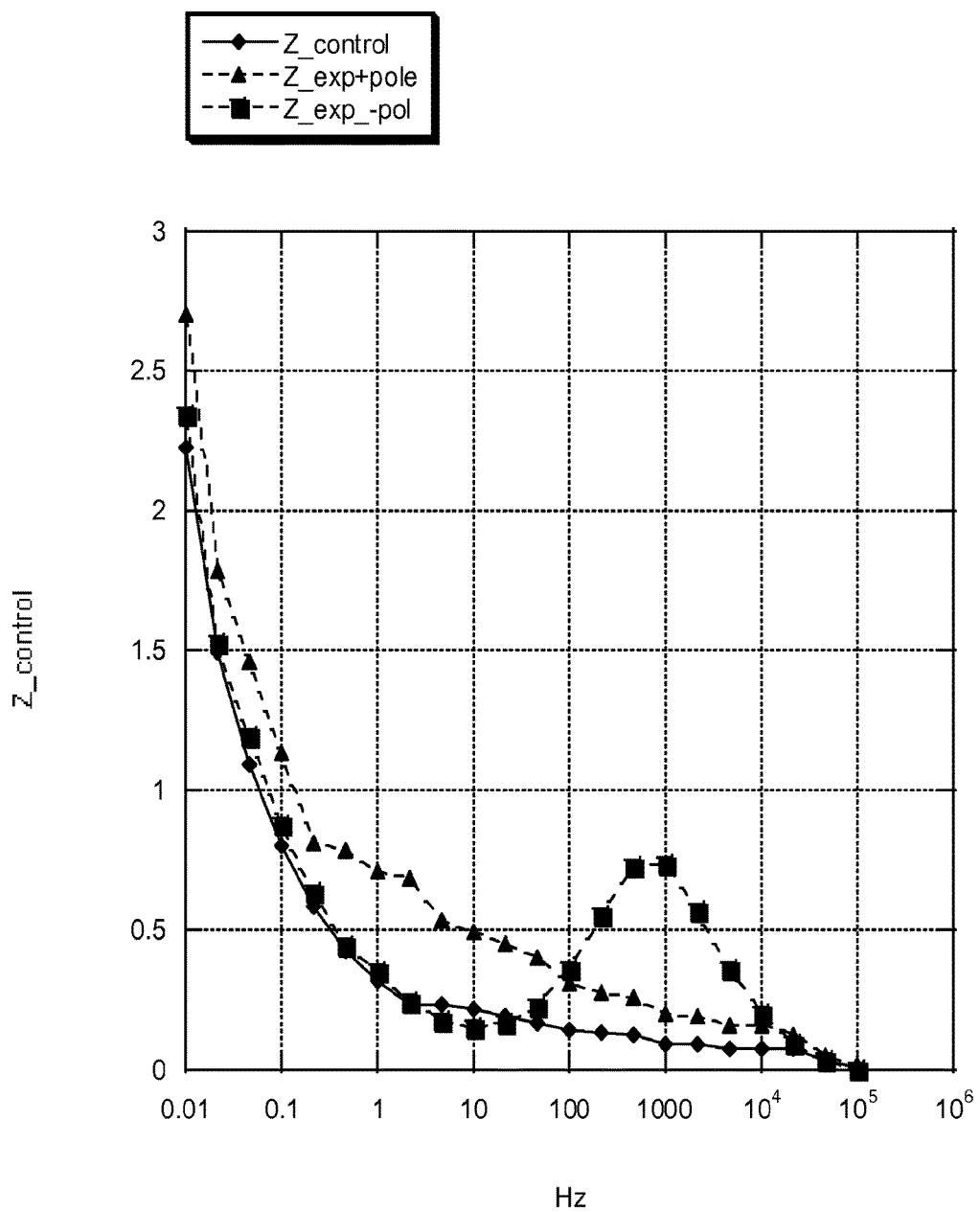
FIG. 7 is a graph illustrating electrical impedance spectrogram comparing anion responsive, cation responsive, and neutral electrodes.

FIG. 7. Data showing an example of the differential polarity behavior of the polarized electrode flow through capacitor. This is an Electrochemical Impedance Spectrogram showing a marked difference in impedance and electrical series resistance behavior in such a flow through capacitor, manufactured from anion responsive and cation responsive electrodes, in the positive versus the negative polarity. For comparison, an identically operated, scientific control, flow through capacitor, using the same carbon electrodes without the contained ionic groups, was also scanned, in a side by side study with the polarized electrode flow through capacitor, across a range of frequencies in Herz, "Hz" while measuring impedance, "Z". The solid line graph with the diamond markers, labeled "Z_control" in FIG. 7 is the otherwise identical, scientific control flow through capacitor cell without the contained ionic groups. The dashed line graph with the triangle markers labeled Z_exp+pole is a graph of the data where a DC bias is applied in the positive polarity of the polarized electrode flow through capacitor, namely, with the positive hole charge carriers going to the anion responsive-attached cationic group electrode (16 in FIGS. 2 and 3) and the negative electron charge carriers going to the cation responsive attached anionic group electrode (15 in FIGS. 2 and 3). The dashed line graph with the square markers labeled The Z_exp-pole is where the DC bias is applied opposite to the above, in the negative polarity, namely, with the negative electronic charge carriers going to the anion responsive electrode (16 FIGS. 2 and 3) and the positive holes going to the cation responsive electrode (15 FIGS. 2 and 3). This data demonstrates the differential, polarity dependant behavior of the polarized electrode flow through capacitor, and of the polarized, cation and anion responsive electrodes. The practical operation range of the polarized electrodes are below 1 Hz. In this frequency range, in this example, the capacitor exhibits a slightly increased impedance in the positive as compared to either the negative polarity or a scientific control with no contained ionic groups. One could speculate that this is because the positive polarity applies a charge that is of like charge to the contained ionic groups attached to the electrode surface, repelling those groups from the surface, the attached groups held away from the electrostatic surface effectively add another layer of charge and effectively creates an additional capacitor in series, composed of attached ionic groups and their counterions, with the counterionic cloud biased in opposition to the underlying electrode. This extra layer of charge layer may create an additional series impedance additive to the underlying impedance of the electrode without the attached charged groups, thereby increasing total impedance. This effect may also cause less total electric capacitance to be observed with a cell charged in the positive polarity. When the capacitor was charged in the negative polarity, the impedance as shown, in FIG. 7 did not change much compared to the scientific control. In this case, the electronic charge carriers supplied to the electrode are opposite in charge to the attached charged ionic groups. One could speculate that the capacitor can at least partially charge by attracting these ionic groups attached to their linkers. By so doing, these attached ionic groups expel their counter ions, causing the ions to concentrate as shown in the top curve in the graph of FIG. 5. The increase in impedance at high frequency may be an artifact, or, one may speculate, it could tell something about the relaxation time of the ionic group as held onto the electrode surface by its linking moiety or tether. In any case, a differential impedance behavior based upon the polarity of the DC bias applied to anion and cation responsive electrode pairs is another diagnostic of the polarized electrode flow through capacitor. In those cases where capacitance is also decreased in the positive polarity compared to either the negative polarity or to a scientific control, that is an additional diagnostic. Capacitance of electrodes of either polarity may also become lowered compared to scientific controls due to linker groups blocking the surface area or due to linkers and attached groups increasing the electrostatic distance between ions and electronic charge. To correct this hydrophilic linkers or electron conductive polymer linkers may be used.

Figure 8:
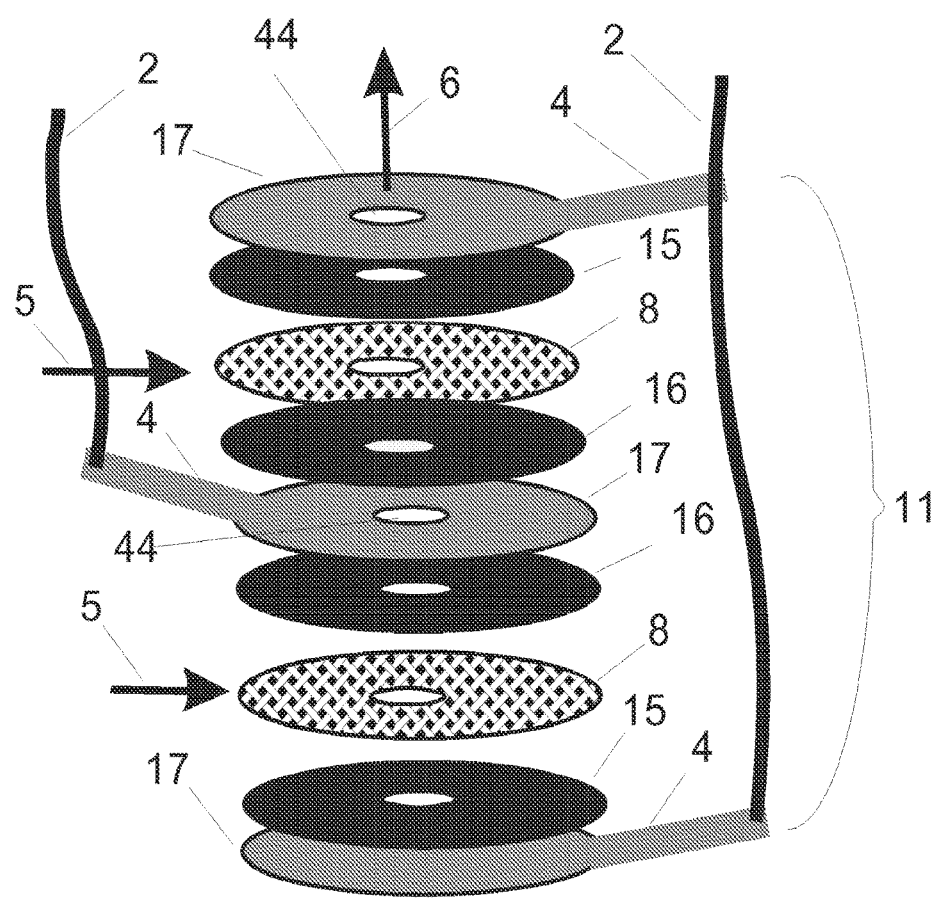
FIG. 8 is a schematic showing the relative position of material layers used in Example 1.

FIG. 8. Generic, relative arrangement of layers used in Example 1 to form a flow through capacitor 11, shown in this case with materials configured in stacked discs with central flow holes 44, with the cation responsive electrodes 15, and the anion responsive electrodes 16, opposing each other on either side of the flow spacers 8, The end electrodes are single sided, and the intermediate electrodes are double sided. There are the same total number of each kind of individual electrode layers 15 and 16. Shown here for illustrative purposes is a cell with only two flow spacers 8 to provide inlet 5 means and outlet means 6. However, any reasonable number "n" flow spacers, n+1 current collectors 17, "n" cation responsive electrodes 15 and "n" anion responsive electrodes 16 may be used, for example, up to "n" equals 1000.

Figure 9:
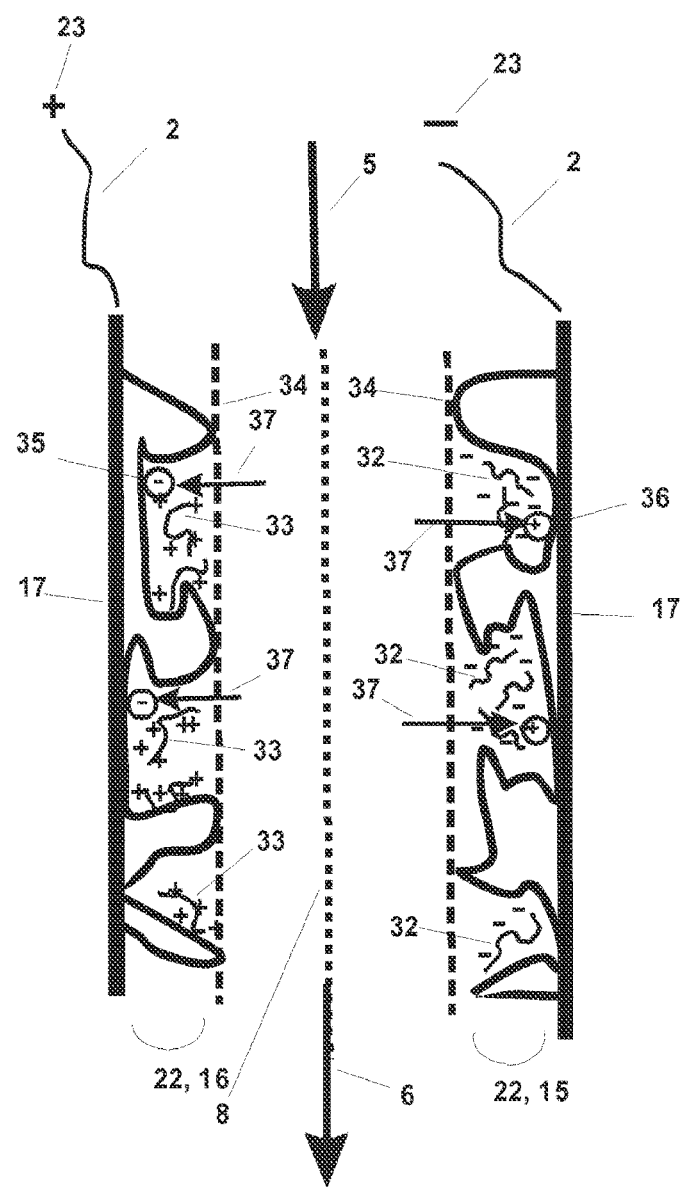
FIG. 9 is a schematic showing a flow through capacitor whereby the ionic group molecules are contained within the electrode pore volume by a semipermeable layer

FIG. 9 depicts the ionic group molecules, anionic 32 and cationic 33 contained within pore volume of surface area porous capacitive electrode 22 by a blocking layer 34. The electrodes with contained anionic group molecules 32 form the cation responsive electrodes 15, and the electrodes with the contained cationic group molecules 33 form the anion responsive electrodes 16. Solution phase anions 35 and solution phase cations 36 migrate through the blocking layer in direction of arrow 37 in response to an electric field. Also included are other parts already identified in the other figures.

Figure 10:
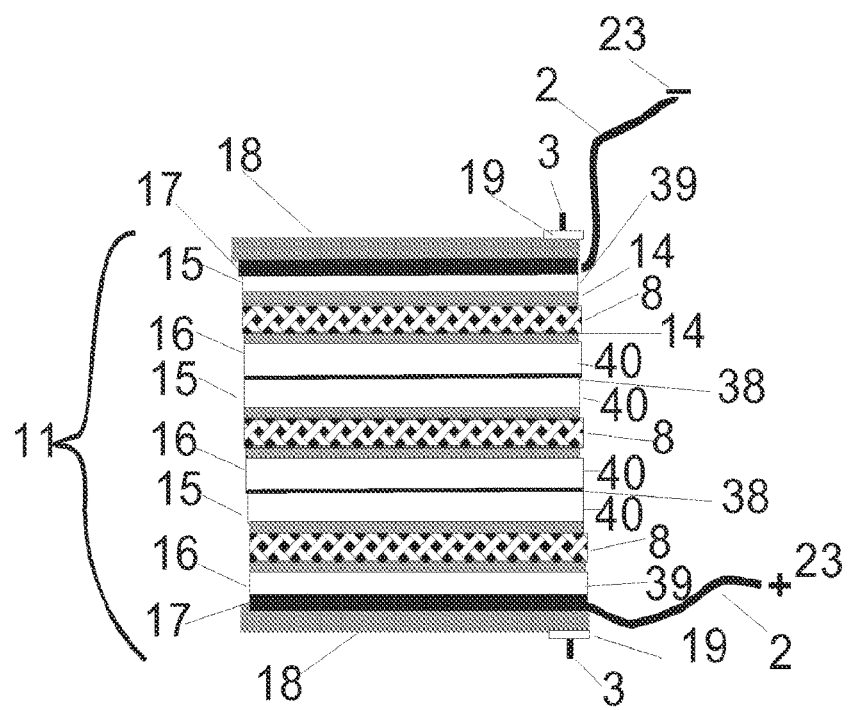
FIG. 10 is a schematic showing the relative position of material layers in a flow through capacitor cell stack of the true series design.

FIG. 10 is a depiction of a true series configuration. A cation responsive electrode 15 and an anion responsive electrode 16 are also labeled 39 to denote end electrodes. These end electrodes are in contact with a facing current collector 17. The internal cation responsive electrodes 15 and anion responsive electrodes face each other across a current collector 38, designed for use in a true series cell. Current collector 38 is electrically conductive to electronic charge carriers, electrons and holes, but is non conductive to and an insulator to ionic charge carriers. Anion responsive electrodes 15 and cation responsive electrodes 16 are disposed on either side of facing current collectors 38 for use as internal electrodes 40. Internal electrodes 40 are free floating, in the sense that there is no direct electronic charge carrier connection to DC current 23. DC current 23 is supplied by a power supply (not shown) to electrical leads 2. Other labeled parts as in the other figures.

Figure 11:
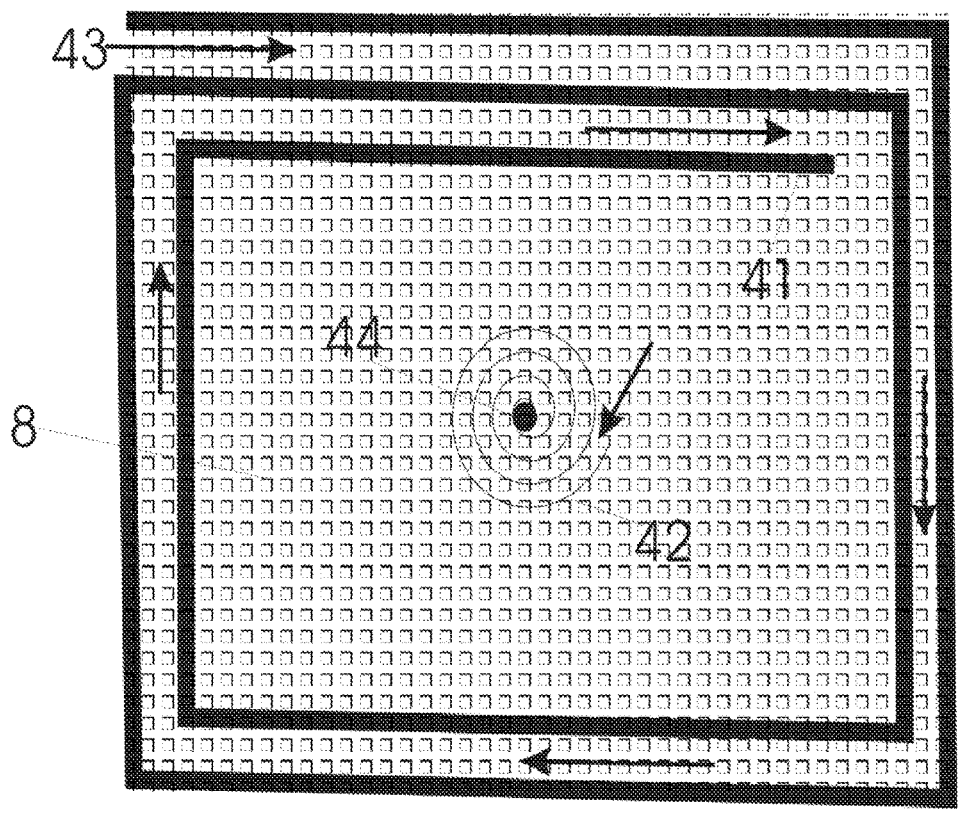
FIG. 11 is a schematic showing a flow spacer for use in a true series design.

FIG. 11 is a depiction of a single flow spacer designed for use in a true series cell. The flow patterns, shown by arrows, are in through tortuous flow channel inlet 43, through outer tortuous flow channel 41, in a radial direction through flow spacer 8 into central tortuous flow channel 42 and out through central flow hole 44.

Figure 12:
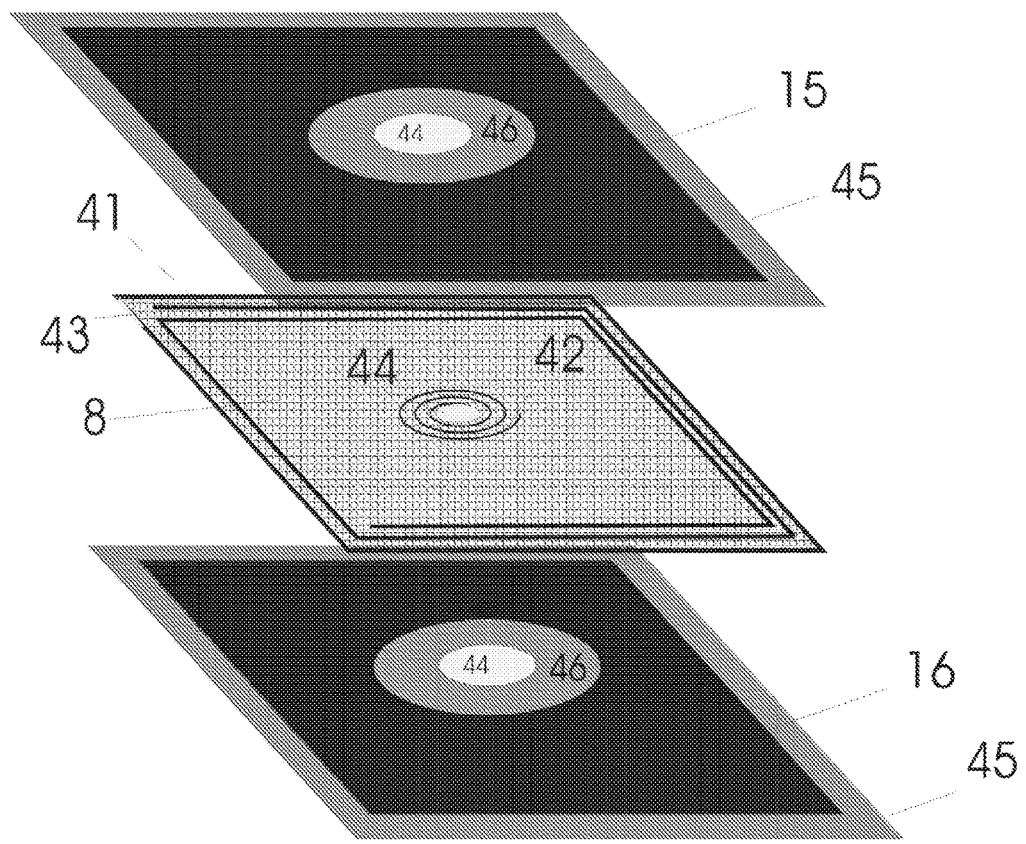
FIG. 12 is a schematic showing the arrangement of gaskets, flow spacers and electrodes in a true series design.

FIG. 12 is a schematic showing the arrangement of electrodes and gaskets around the flow spacer in a true series design. Cation responsive electrode 15 and anion responsive electrode 16 are disposed on either side of flow spacer 8. Flow spacer 8 has external perimeter tortuous flow channel 41 and internal tortuous flow channel 42 around central flow hole 44. Electrodes also have central flow holes 44 which line up together in the tightly stacked material layers of a flow through capacitor to form a central bore which defines a flow channel. External gaskets 45 are positioned around the perimeter of the flow spacer Internal gaskets 46 are positioned around the outside of the central flow holes. The electrodes fit inside the external gaskets, and around the outside of the internal gaskets The gaskets seal against the electrodes and the inner and outer perimeters of the flow spacer in order to form a sealed, long flow path that provides resistance and isolation against ionic conductance between additional multiple layers of individual series cells, not shown.

EXAMPLES

Example 1

In this example, the electrodes used were a high capacitance activated carbon powder electrode held together with 5% fibrillated PTFE binder made according to standard techniques similar to those described in many patents, including but not limited to U.S. Pat. No. 4,379,772, herein incorporated by reference. These electrodes were further modified into cation and anion responsive electrodes by soaking the electrodes in separate surfactant solutions at room temperature. For this experiment, sodium dodecyl sulfate, CAS number 151-21-3 was chosen as an anionic surfactant with which to adsorb and attach anionic groups on the cation responsive electrode, and hexadecyltrimethylammonium bromide, CAS number 57-09-0, (also known Cetrimonium bromide, $((C16H33)N(CH3)3Br$, or cetyltrimethylammonium bromide) was chosen as the cationic surfactant with which to adsorb and attach cationic group on the anion responsive electrode. In order to form cation responsive electrodes the carbon electrodes were soaked in a solution of one half the critical micelle concentration of sodium dodecyl sulfate, together with 0.1M NaCl. To form the anion responsive electrodes, these carbon electrodes were soaked in one half the critical micelle concentration of hexadecyltrimethylammonium bromide together with salt as 0.1 M NaCl. The optional additional salt was used to "salt out" or electrostatically diminish the charges on the surfactant, in order to cause more surfactant to adsorb to the electrode surface. In this example, the electrode soaking times were one month, with occasional stirring. After this soaking period, the electrodes where thoroughly washed by soaking in a container while stirring with at least 1 liter of water for at least one minute. On an electrode weight basis, the electrodes were washed with over 70 milliliters water per gram of electrode material for at least one minute. FIG. 8 shows the relative arrangement of numbered parts and material layers used in this example, including the flow spacers, electrodes and current collectors. In this example the optional central support or mandrel means was in this case not retained, and the flow through capacitor electrode and other materials were held together under compression by square end plates themselves held together with screws on the four corners, not shown in FIG. 8. The carbon electrodes were approximately 0.4 millimeters thick and cut into 7.6 centimeter diameter discs with a 0.63 centimeter wide central flow hole. The flow spacers in this example were composed of approximately 0.1 min thick, approximately 30% open area nylon woven material cut into slightly wider circles, so as to overlap the electrodes to prevent short circuits. Finally, a sheet of graphite foil less than 0.4 millimeters thick, for use as a current collector was cut into 7.6 centimeter diameter discs with a 0.63 centimeter wide central flow hole. This current collector was cut to match the electrode facing area, with extending tabs approximately one centimeter wide. The current collector tabs were bundled in parallel, fastened together and attached to conductors to form opposite polarity conductive leads. These material layers were then put together into a flow through capacitor cell comprising double sided electrodes of alternating polarities, anion and cation responsive, on opposing sides of a flow spacer, with single sided electrodes at either end of the cell stack. The double sided electrodes were made of like polarity, anion or cation responsive electrodes placed in a sandwich on either side of the current collector to form double sided anion and cation responsive electrodes. The top and bottom end single sided electrodes had the current collector as a conductive backing on the side away from the flow spacer. The flow path was in through the parallel flow spacers, and out through a central bore formed by the alignment of center flow holes in the stacked together electrode, current collector, and flow spacer layers. The flat disc design used in this example was similar to that described in typical flat stacked designs such as FIG. 4 of U.S. Pat. No. 5,620,597, herein incorporated by reference. However, The cell configuration used may have been any standard flow through capacitor design, including the spiral wound and other designs described in that patent. In total, there were twenty electrode layers, ten of each kind, totaling fourteen grams dry weight of surface area capacitive carbon. Eighteen of these electrodes were double sided, with two single sided electrodes sided placed at either end of the flow through capacitor stack. There were ten flow spacers and ten current collectors. The cell volume was less than 100 milliliters. This cell was used to obtain the data shown and described in FIG. 5, FIG. 6, and FIG. 7. A current density of over 20 milliamps per square centimeter of electrode, in this example, over 50 milliamps per square centimeter, was measured with the 0.1M NaCl solution as the electrolyte. For clarity, the square centimeter area being referred to here is the sum of the macroscopic areas of the side of the electrodes facing the flow spacer. The cell was operated at 1.2 volts DC in positive polarity in order to produce a purified solution. The cell was shunted in order to produce a concentrated solution. The charged cell held at 1 volt for fifteen seconds or longer after being disconnected from a 1.2 volt power supply and voltage source. The parallel resistance was measured at greater than 100 ohm cm$^2$, in this case, 1359 ohms cm$^2$, where the cm$^2$ refers to the square centimeter total area of the electrode facing part of the flow spacers, as measured on the basis of one side of each of the flow spacers.

The sodium dodecyl sulfate used has a pKa at or close to 3.3 (Colloids and Surfaces B: Biointerfaces Volume 43, Issues 3-4, 10 Jul. 2005, Pages 150-157), and the hexadecyltrimethlyammonium bromide used has a pKa at or close to 9.8 (Weast R. C. editor CRC Handbook of Chemistry and Physics 55'th edition Cleavland RC Press 1974). Use of recorded literature values is a guideline for which chemicals to use, in lieu of measuring values of the ionic groups on the derivatized electrode. The pKa's of the surfactants and other ionic groups used may change from the literature values once they are attached to the electrode surface.

Example 2

In another example, a mixture of 10% carbon black, and 90% activated carbon, jet milled to less than 40 microns, with a surface area of 1400 square meters per gram B.E.T (Brunauer, Emmett, Teller method), a total pore volume of 0.7 cubic centimeters per gram, and a combined meso and micropore volume of 0.4 cubic centimeters per gram, was used as a base capacitance material. Two batches of a one fourth subcritical micelle concentration of sodium dioctyl sulfosuccinate anionic surfactant and N-alkyl-N-2-hydroxyethyl-N,N-dimethyl ammonium bromide cationic surfactants respectively were added in separate containers in an excess amount of more than one half liter per 100 grams of electrode material respectively. The critical micelle concentration of surfactants was determined by isothermal titration calorimetry as described in "What can isothermal titration microcalorimetry experiments tell us about the self-organization of surfactants into micelles?" Kawthar Bouchemal et. al., J. Molec. Recognit. (2009). The resulting suspension was stirred with a propeller means for one hour, and then strained in a cloth microfilter. The resulting carbon slurry was 50% solids weight by volume. Some of this wet paste was then dried and stored for later use. The resulting concentration of adsorbed, attached anionic and attached cationic groups on each of the samples was determined by elemental analysis to be 1.5 mole/kg and 0.9 mole/kg electrode dry weight respectively. A portion of the carbon material was resuspended in a slurry containing 5% by weight latex binder, 50% by weight of the carbon slurry, and 50% by volume of water. This was blade coated 0.5 millimeters thick onto both sides of 0.5 millimeter thick graphite foil current collectors, and left to dry overnight, to make these into double sided electrodes, that is, current collector coated on both sides with either anion or cation responsive material. These procedures were used for each of the two batches to make separate cation and for anion responsive electrodes. These were used to make flow through capacitor stacks. Single sided electrode coatings were also blade coated onto graphite foil to use as the end electrodes of the flow through capacitor stacks. Subsequent flow through capacitors purified a dissolved ion containing feed to greater than 70 percent purification, greater than 50 percent water recovery, at a coulombic efficiency of greater than 50%, at an energy usage of less than 3.5 joules per coulomb of ions purified. Purification performance did not deteriorate more than 25% after 100 purification cycles.

Example 3

In another example, the procedure of example two was repeated with the addition of a 2% weight amount per dry weight electrode of the calcium ionophore ETH 5234 to the carbon electrode material batch containing the anionic surfactant. The cation responsive electrode resulting from adsorption of this ionomer to the carbon electrode surface was used together with the anion responsive electrode of example 2 in a flow through capacitor that selectively removed calcium and- or alkalinity from feed water for use in water softening applications.

Example 4

In another example, anionic and cationic batches of were adsorbed onto capacitive carbon powder in order to derivatize separate batches of each polarity of attached ion capacitive carbon powder electrode material. In order to fill up to 100% of the average pore volume with attached ionic groups, the surfactant chain length, ionic linker group arms, or total polyelectrolyte length used to attach attached ionic groups to a carbon electrode surface were selected so that the maximum distance between the electrode surface and the attached ionic groups would be greater than 10%, for example 100% of the average pore radius of the subsequent, finished composite carbon-binder electrode material. As one example, in this case of an integral electrode material with a 65 nanometer average pore radius, the minimum number of mers required to equal this radius is estimated by dividing this radius by the 1.54 Angstroms carbon to carbon bond length. This equals 434 mers, or carbon atoms needed in the longest chain of a linear or branches polymer or polyelectrolyte. This calculation for practical use is an estimate because it assumes full chain extension. However, chain extension may be facilitated by electrostatic repulsion from the electrode surface. Typically, ionic molecules under 10,000,000 D may be used at up to 20% dry weight of electrode used.

Example 5

In another example, for use as anion or cation responsive electrodes, a polyionic polymer mixture with between 1 and 160 carbon to carbon atoms bonds or "mers" per molecule is attached using a Friedel Crafts reaction to covalently attach attached anionic or cationic groups with tethers to a 30 micron average particle size powdered 1200 m2/gram B.E.T. surface area carbon material surface, where the carbon material has a pore distribution containing micro and mesopores. The tethers vary from 1 nanometer long to 25 nanometers long and fill half or more of the radius of the micropores and mesopores.

Example 6

In another example, a spiral wound flow through capacitor is made from pairs of opposite polarity groups covalently or adsorption attached to electrodes. The electrodes are double sided with like polarities coated double sided upon 0.25 millimeter thick graphite foil, but facing each other in opposing polarities across a thin, 0.5 millimeter thick polymer fiber or netting flow spacer. The attached acid anionic electrode groups are a pKa of 5, the attached basic cationic electrode groups are a pKa of 9, and used to purify a feed water of pH 7.9.

Example 7

In another example procedure to covalently attach fixed sulfates, to form negative ionic group derivatized carbon materials, an activated carbon having a specific surface area of from 200 to 3,500 m2/g and a particle size of from 0.1 to 100 microns, or a carbon black having a specific surface area of from 200 to 1,500 m2/g and a particle size of from 0.001 to 1 microns was used, or a mixture of these, was used as the carbon. To this was added sulfanillic acid or sodium sulfanilate, and water, in a ratio by weight of five parts or less, one part or less, and ten parts or less. These ingredients were placed in a rotary drum mixer and mixed for less than sixty minutes at 100 degrees C. or less. Concentrated Nitric acid was added, and allowed to mix for an additional period of ten minutes or less. A solution containing one half part by weight of sodium nitrate in less than three parts by weight of water was added in order to form a diazonium salt to react with the activated carbon. This was mixed an additional sixty minutes or less. The resulting product was analyzed by standard method ASTM D1619-03 (2008) to contain up to 10 milliequivalent per gram of anionic p-C6H4SO3- groups covalently attached to capacitive material for use in cation responsive electrodes To covalently attach fixed quaternary amines to form positive ionic group derivatized carbon materials, an activated carbon having a specific surface area of from 200 to 3,500 m2/g and a particle size of from 0.1 to 100 microns, or a carbon black having a specific surface area of from 200 to 1,500 m2/g and a particle size of from 0.001 to 1 microns was used, or a mixture of these, was used as the carbon. In amounts by weight, twelve parts carbon was added while stirring to a solution of less than 10 parts of quaternary ammonium salt where the R group may be any alkyl, aryl, or hydrocarbon molecule, in this case 3-aminobenzyltrimethylammonium chloride. Less than five parts concentrated nitric acid was added and heated while stirring to less than 100 degrees Centigrade. A solution of less than five parts NaNO2 in less than ten parts of water was added over a period of less than ten minute in order to form a diazonium salt to react with the carbon in order to form cationic 3-N2C6H4CH2N(CH3)3+ groups covalently attached to capacitive material for use in anion responsive electrodes.

The above two carbons were selected for surface area and capacitance properties so that the single electrode anode and cathode capacitances would be matched when put together for use in a capacitor cell with a total series capacitance.

The carbons above were formed separately into cation and anion responsive electrodes as follows. A binder solution was prepared by adding 2 g sodium carboxymethylcellulose and 10 grams of a 40% styrene-butadiene rubber emulsion in water, and then mixed with 95 grams of capacitor carbon material, and adjusted with water, so that, when wet-mixed for less than 3 hours to form a slurry solution, the resulting slurry solution had a viscosity of about less than 4000 cps. The slurry solution was coated on both surfaces of 0.6 millimeter thick graphite foil current collector to a thickness of 100 microns or less in order to make integral electrodes. The electrode was dried to form an electrode with greater than 90% carbon and less than 10% binder dry weight. Next, protective material coatings where formed on one face of both of the respective electrode types in order to form a protective material coating against electrical short circuit and leakage. Accordingly, an aqueous solution containing 15% PVA and 5% vinyl ether maleic anhydride copolymer, in weights per volume was coated onto the electrodes to a thickness of 250 microns by a film applicator or a spray device. The coating film was irradiated with 35 Kilograys of electron beam radiation to form a protective material in the form of ionically conductive layers. The final electrode was slit to a width of 10 cm and rolls of a length of 10 meters. Titanium leads were attached on to a half meter section of the final electrodes. Two half meter sections, in a pair comprised of one of each kind of different electrode, were wound together with the protective material layers facing a flow spacer separator (TF4035 from Nippon Kodoshi Corp). The spiral wound flow through capacitor was placed into a schedule 60 PVC pipe cartridge holder provided with top and bottom flow fittings, to make a flow through capacitor with an end to end flow path. The titanium leads attached to a titanium screw extending through the cartridge holder in order to provide plus and minus terminals to connect to a source of DC power and system containing polarity reversal or shunt relays and programmable computer controls.

Example 8

The following is an example, analogous to that described in J. Am. Chem. Soc. 1997, 119, 201-207, herein incorporated by reference, of the pore volume surfaces of carbon electrodes derivatized with covalently attached molecules to form attached ionic groups by applying an electric potential to carbon electrodes and diazonium salts, R-N2+ X, where X is an inorganic anion such as a halogen or tetrafluroborate and R may be any alkyl or aryl group. These groups may be selected to contain strong acid or strong base groups to make separate batches of carbon with these groups for use as anion and cation responsive electrodes. Alternatively, alkyl or aryl groups may be selected for ease of further modification into these groups by standard organic chemistry techniques.

For this example an aryl group diazonium salt, represented below by "Aryl group-N triple bond N+" is covalently bonded to a carbon electrode in the following reaction sequence at a standard electrode potential of up to negative 2.5 volts, acetonitrile as a solvent, and a 0.1 M tetrafluoroborate salt of the diazonium molecule.

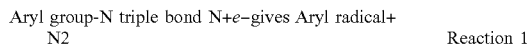

Aryl group-N triple bond N+e–gives Aryl radical+ N2    Reaction 1

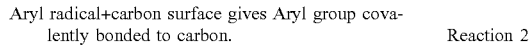

Aryl radical+carbon surface gives Aryl group covalently bonded to carbon.    Reaction 2

Two separate batches, one where the aryl groups contained sulfonic acid strong acid groups, and one with quaternary amine strong base groups were made in order to form the electrode material for subsequent use in cation or anion responsive electrode formulations. Accordingly, these individual carbons where mixed with 5% by weight of a latex binder and coated 0.5 millimeter thick onto both sides of 0.5 millimeter thick graphite foil current collectors The opposite polarity double sided electrode current collectors, were spiral wound together on opposing sides of a 0.5 millimeter, 40% open area, woven, nylon flow spacer to form spiral wound flow through capacitor cells.

Alternatively the electrode formulation may be impregnated into separate sheets of nonwoven graphite fiber cloth to form both anion and cation responsive integrated current collector-electrode material for use in spiral wound cells.

The above electrodes may also be cut into disks with a central flow hole and placed in a stacked disk arrangement aligned around a central support tube which extends through a cartridge holder and also serves to form a flow outlet.

Example 9

In another example, analogous to Nanoletters 2003 Vol. 3, No. 9 pages 1215-1218, herein incorporated by reference, ionic molecules were covalently attached onto carbon in order to form attached ionic groups, where the carbon had previously had a surfactant previously adsorbed onto it in order to help disperse the carbon and facilitate the reaction of diazonium salts with the electrode material of choice. In this case activated carbon is given as an example, but other conductive materials, such as nanotubes, graphene sheets, or any other form of carbon, ceramics, or conductive polymers may also be used. A150 Farad per gram (on a single electrode capacitance basis), KOH activated carbon from Kuraray product number NK-260 (80) was ground to an average particle size of 25 microns, and soaked for one hour, while under sonication or stirring, at 30 degrees centigrade, in ten parts by weight of a solution of cationic 55 millimolar anionic surfactant sodium dodecyl sulfate in 3 mMolar HCL, or, 55 millimolar cationic surfactant dodecyltrimethylammonium bromide in 15 millimolar KOH, or, 55 millimolar non ionic surfactant Triton X100 Sigma Aldrich number. To this was added diazonium salts at 16 equiv per mole of carbon generated from various 4-substituted anilines selected for anionic or cationic groups, analogous to J. Am. Chem. Soc. 2001, 123, 6536, herein incorporated by reference, and stirred at room temperature for 10 min. The product was filtered through a 10 micron PTFE filter membrane. The filtrate was washed with an equal amount of acetone, then distilled water, then another equal amount of acetone to remove any unreacted surfactant. These were dried overnight in a vacuum at 65 degrees centigrade, and stored in sealed containers for later use in anion or cation responsive electrodes.

Example 10

In this example, analogous to the method described in J. Am. Chem. Soc 1993, 115 pages 9835-9837, herein incorporated by reference, phenol-functionalized carbon was prepared by reaction of a high surface area, graphitized, mesoporous carbon nanopowder less than 500 nanometers wide, Aldrich catalogue number 699632, also CAS number 1333-86-4, with bis@-methoxyphenyl diazomethane followed by hydrolysis of the methyl ethers with BBr3, to yield a 6-6 bridged methano-carbon surface derivative carrying only two phenolic sites as the major product. Polyether dendrimers prepared by the convergent synthesis route are ideally suited for attachment to phenol functionalized carbon, according to this reference, since they carry a single electrophilic site at their focal point. The formation of carbon surface attached dendrimers was accomplished by reaction of each of the two phenolic groups located at the surface of the functionalized carbon with the single benzylic bromide group at the focal point of a fourth-generation dendrimer in the presence of K2C03. The Dendrimers were chosen for either strong acid or strong base group functionality, in order to form cation or anion responsive carbons.

Example 11

The following is a example of the grafting molecules or polymers onto carbon through dehydration reactions utilizing existing oxygen groups on the carbon. Any of the methods disclosed in U.S. Pat. No. 4,835,074 may be used, which described formation of derivatized electrodes for use in electrochemical energy producing or energy consuming cells, herein incorporated by reference, where the carbon has been previously oxidized in Nitric or other acid or in O2, by electrochemical or other means. In this example, a polyether backbone molecule, based either on propylene oxide (PO), or ethylene oxide (EO), with sulfate or quaternary amine groups attached to the terminus, is grafted onto the carbon in order to covalently attach by a tether attached anionic or cationic groups to the electrode pore volume surface area.

A high capacitance activated carbon with 90% of the pore volume comprising meso plus micropores, of 1000 m2/gram B.E.T. surface area, was exposed to a 12% solution of either sodium hypochlorite, or potassium permanganate, or ammonium persulfate, and sufficient distilled water along with 1 % by weight isopropyl alcohol wetting agent in order to form a slurry. This mixture was stirred for twenty four hours, washed in distilled water, and soaked in 0.1 NHCL to protonate any carboxylate functionality on the carbon surface, then washed in distilled water and dried. Surface oxygen concentration was determined by elemental analysis to show surface carboxyl, hydroxyl or other oxygen containing groups that were formed were between 0.1 and 10 milliequivalents oxygen per gram of carbon electrode material. To this was added an equal part by weight of tetra alkyl quaternary salt of polyoxyalkylene-amine with a molecule weight between 1000 and 2000 grams per mole, together with three parts toluene. The mixture was subjected to azeotropic distillation under stirring and reflux for fourteen hours, after which the derivatized carbon was recovered by filtration. This gives a capacitance carbon for use in anion responsive electrodes. Analogous or similar molecules containing sulfate or phosphate groups may also be used in order to form cation responsive electrodes.

Example 12

In another example, strong base quaternary, or tertiary amine group used to form anion responsive carbon electrodes may also be prepared from amide precursors. One part oxidized carbon to eight parts anhydrous toluene was mixed together and stirred while slowly adding one fifth part thionyl chloride. After stilling 15 hours, the excess thionyl chloride was distilled off. The reaction mixture was cooled, and one fifth part of N,N dimethylamine in 1 part toluene was added slowly. The mixture was stirred six hours, after which excess distilled water was added. The resulting carbon product was filtered and washed with dilute HCL, water, and isopropyl alcohol, then dried in vacuo. To form a tertiary amine one part of the dried amide product produced above was added to 20 parts of dry diethyl ether in a three neck flask equipped with a condenser and a dropping funnel containing a tenfold excess of LiAlH4 in ether. The LiAlH4 solution was added drop wise over two hours. The reaction mixture was quenched with water, and then filtered. The carbon filter cake was washed with water and dilute hydrochlroric acid (HCL) and again with water, then dried in vacuo. The tertiary amine functionalized carbon was determined by elemental analysis to have between 1 and 10 milliquivalents of nitrogen per gram of carbon. The tertiary amine was then quarternized to form a strong base. This may be done using such reagents and methods which are standard to preparation of quanternary salts, such as use of alkyl halides or dialkylsulfates, or according to any of the procedures in U.S. Pat. No. 5,463,094, herein incorporated by reference, for example by reacting with dimetyhlsulfate under inert gas at elevated temperature.

Example 13

In this example of forming spiral wound cells, the winding machine has a removable tubular mandrel around which the capacitor material layers are wound. The mandrel is removed with the spiral wound cell from the winding machine to become the core support structure, or optionally to form a flow outlet, for the finished flow through capacitor. Leads are formed by cutting tabs from the current collector current collector layers deliberately overlapped out the top and the bottom of the cell for this purpose. One example of such a resulting spiral wound flow through capacitor and cartridge holder is as depicted in FIG. 1.

Example 14

In this example, energy is recovered from one or more flow through capacitor cells that have been charged to a voltage and which contain stored energy after being charged with adsorbed ions from a flowing solution. It is a fact that capacitors charged at constant current store more of the energy used to charge them compared to a capacitor charged at constant voltage. Accordingly, in order to obtain the maximum amount of recoverable energy, at least one flow through capacitor is charged with constant current for a portion or substantially all the charging cycle. In order to recover the stored energy, at least one charged capacitor is discharged through an energy recovery electrical circuit designed to accept its declining output voltage and boost this into the increasing input voltage of at least one charging capacitor. The energy recovery circuit may optionally change to a buck converter at or after the point at which the voltages of the two capacitors equalize. This energy recovery circuit may therefore either buck, boost, or first buck and then boost, the discharging capacitor voltage and feed this into at least one other flow through capacitor, power supply, pump, or other electrical load. The output of the energy recovery circuit may be constant current, in order to charge another capacitor at better energy efficiency, or, may be constant voltage, in order to charge another capacitor at faster flow rate utilization. The energy recovery circuit may contain a DC to DC converter, a bidirectional DC to DC converter, or switch mode converter, or a flyback or feed forward switch mode power supply. Energy efficient design strategies useful for this purpose may include switched mode power conversion, switching frequency variation, independently controlled active rectification, or use of MOSFETs and FETs. DC to DC converters using zero voltage switching may be used in energy recovery circuits. Half bridge, full bridge, or flyback transformers may also be used in the energy recovery circuits. Other examples of DC to DC converters for use in energy recovery circuits include U.S. Pat. Nos. 6,069,804, 4,736,151, 3,986,097, 5,066,900, 6,205,035, 5,768,118, and 7,046,525 B2, herein incorporated by reference. In addition, an AC to DC or DC to DC, buck or boost converter may also be an intermediate part between a fixed voltage AC or DC power supply, power line, or voltage source, and the charging or discharging flow through capacitor.

Example 15

In this example of a flow through capacitor is made with opposing pairs of active carbon capacitance electrodes, each electrode of the pair is infused with an ionically charged molecule or polyelectrolyte of over 100 Daltons molecular weight. One electrode of the pair has positive polarity ionic groups by virtue of being infused with a strong acid cationic ionic group molecule or polyelectrolyte, and the other electrode of the pair has a negative polarity ionic groups by virtue of being infused with a strong base anionic ionic group molecule or polyelectrolyte. Both electrodes have a small porous dialysis membrane that is placed across the flow spacer facing area of the electrode as a blocking layer. This membrane has a molecular weight cutoff that is smaller than 100 Daltons. Optionally, the membrane is sealed, gasketed, or pressed firmly such as with a plastic frame around the edges of the electrode as a precaution against any electrode fluid from leaking out from the edges. A flow through capacitor is made containing material opposing electrodes containing opposite polarity ionic group polyelectrolytes which face each other across a flow spacer, in layers 0.5 millimeter or less thick of the electrodes, graphite foil current collectors on the electrode side opposite the flow spacer, and flow spacers. This flow through capacitor purifies a solution of 500 parts per million total dissolved solids or higher to greater than 50 percent purification at a flow rate of greater than 1 milliliter per minute per gram of electrode material with a coulombic efficiency of fifty percent or higher.

Example 16

In this example, a 0.01 moles per liter NaCl solution gives an estimated 2.1 nanometers Debye length according to equation 1. Therefore, it is expected that, under these conditions, an electrode assembly of opposing pairs of microporous electrodes with opposite charged contained ionic groups would be a coulombically efficient polarized electrode flow through capacitor.

Example 17

In this example, a true series cell included one anion responsive and one cation responsive electrode placed at either end of the cell backed by a 0.040 inch thick titanium foil current collector. The total number "n" of electrodes, in this case 22 electrodes included "(n−2)/2" internal electrode pairs, in this case 10, formed by an anion responsive and a cation responsive electrode sandwiching a facing electrically conductive, ion insulting current collector made from conductive vinyl less than 0.020 inches thick. The end titanium current collector was doped with platinum, ruthenium, or palladium to provide conductivity through the surface oxide layer. A facing flow spacer separated each electrode pair current collector sandwich. The true series cell from "(n−2)/2" pairs of internal electrodes formed ""((n−2)/2)+1" cells, or in this case 11 cells in series. Each cell was charged to an individual cell voltage of 1.2 volts. The true series cell was charged with a total voltage of the individual cell voltage times "n+1", or in this case, 13.2 Volts. More than 10 ohms was provided between individual cells of the series stack by means of tortuous flow channels within the flow spacer. In addition, the edges of the electrodes and current collectors were sealed. A tortuous flow channel is formed from a gasket which seals around the outside perimeter of each flow spacer in a pattern around a two inch thick or less outer region of the flow spacer, with narrow inlets and outlets for fluid flow. After the flow spirals in through the edge tortuous flow channels, the flows moves in a radial direction towards the middle of the cell, and exits out through a central tortuous flow channel and central flow hole. The tortuous flow channels were formed by printing a pattern onto the flow spacer. An alternative arrangement of tortuous flow channels would be on either end of the cell, with flow going across the cell in a side to side direction.

Example 18

This is an example of the predictions according to Equation 3 above, of the amounts of ions inside and outside of the double layer volume in a microporous electrode material whose surface is derivatized with ionic groups. This equation was programmed into Mathcad version 14.0 software (Parametric Technology Corporation, Needham, Mass.). This allows the calculation of an estimated amount of ionic molecules which need to be adsorbed, covalently attached, or otherwise contained, within a given pore volume electrode material, under given solution conditions, to achieve a desired percentage Donnan exclusion, in this particular example, 75%.

The actual Mathcad programming is represented below by italics.

Enter the average molecular weight of the electrode contained ionic molecules or mixture, in this example, sodium dodecyl sulfate, used to form a cation responsive electrode.

molecular weight=288.38 grams/mole

Enter an ion exchange capacity of contained ionic group concentration, expressed as equivalents per liter of electrode pore volume, in this example 0.3 equivalents per liter on an electrode pore volume basis contained ion=0.3 equivalents/liter Enter the external solution ion concentration on a per liter basis, in this example, 0.05 equivalents per liter.

N=0.05 equivalents/liter enter the number of charged groups per attached ionic molecule z=1

Use the molecular weight, to calculate the grams per liter of electrode pore volume of such molecules corresponding to the ion exchange capacity entered above.

$$grams = contained\ ion \times \frac{molecular\ weight}{z}$$

grams = 86.514 grams/liter given equation 3, where x is the amount in equivalents of solution phase co-ion that is driven out of the microporous material by action of Donnan exclusion
given coion inside×(coion inside+(contained ion))=(coion external)$^2$ coion inside=N−x
coion external=N+x
Make guesses to set up an iterative calculation
guesses
x=8 equivalents/liter
coion inside=0.00001 equivalents/liter
coion external=1 equivalents/liter
vec=Find(x, coion inside, coion external)
The solution below gives from top to bottom, "x", "coion inside", and "coion external", where "coion inside" are the internal ions and are on an equivalents per liter pore volume basis.

$$vec = \begin{pmatrix} .03 \\ .02 \\ .08 \end{pmatrix} equivalents/liter$$

The solution below gives the ratio of equivalents of coions on inside to coions external to the surface derivatized microporous material, used to calculate percent Donnan exclusion.

$$R = \frac{vec_1}{vec_2}.$$

R = 0.25

The percent Donnan exclusion is predicted below at 75%.
Donnan=(1−R)×100
Donnan=0 75
For the purposes of these calculations, the pore volume of an electrode material may be estimated by simple water uptake of a dry electrode sample, subtracting the dry from the wet weight, in order to calculate the pore volume from the solution density in liters per kilogram of electrode.

Equation 3 as used above applies to the portion of the total pore volume affected by Donnan exclusion. The maximum amount of pore volume affected by Donnan exclusion may be the total pore volume. This case occurs if the porosity of the material is small enough so that the average pore radius fall within one Debye length. The minimum amount of pore volume affected by this Donnan exclusion, in those cases where the attached ionic groups are located within a Debye length of the electrode surface, on the other hand, predicted by equation 3, may be only that portion of the total pore volume which is the double layer volume. This double layer volume is the volume within a Debye length of the surface as defined by equations 1 and 2. In this minimum case, the estimated amount of Donnan exclusion as a function of the total electrode may also be corrected by considering that amount of pore volume that is outside of the influence of the double layer volume. In this particular example of a 0.05 M feed, equation 1 predicts a Debye length of 0.963 nanometers.

Example 19

In another example, using an electrode with a known pore distribution such that 80% of the pores are below 0.963 nanometers in size, the Donnan exclusion ratio may be corrected by reducing the results of equation 3 by a multiple of the percentage of the average pore radius that are within one Debye length, or by a multiple of one, whichever is smaller, in this case 80%. In this example, that is 75%×80%=60%.

Example 20

It is possible to make an electrode material from large carbon particles that together form large macroporous interstitial voids. In another example, using a macropore containing electrode with a 1200 square meter per gram surface area, the pore volume is known, at 2 cubic centimeters per gram. The Donnan exclusion ratio given by equation 3 can be corrected by the multiple of the double layer volume divided by the known pore volume, or by a multiple of one, whichever is smaller The double layer volume is given by equation 2 as (1200 m2/gm)(0.963 nm)=1.156 cubic centimeters per gram. The corrected Donnan exclusion is (1.156/2)×75%=43%.

It is also possible for the ionic groups attached to the surface to extend beyond a Debye length of the surface, past the double layer. In this case the result of equation 3 may be corrected by a multiple of the ratio of the average extended length of the ionic group molecule divided by the average pore radius, or by a multiple of one, whichever is smaller.

Finally, where the contained ionic groups are free floating in the pore volume solution and protected from escaping the electrode by a blocking layer, then these ionic groups affect the total pore volume.

Example 21

In another example of direct derivatization of electrodes with ionic groups, carbon containing, ionic group electrodes may be prepared according to the method of David Pech et. Al, in Electrochemical and Solid-State Letters, 11 (11) A202-A205 (2008), herein incorporated by reference. Sulfophenyl ionic groups are grafted onto the carbon by mixing carbon powder, dispersed in deionized water, with different equivalents of sulfanilic acid, sodium nitrite, and hydrochloric acid. The mixture is stirred for twenty four hours, filtered and washed successively by water, methanol, dimethylformamide, and acetone to remove excess salts, impurities, and loosely attached species. The surface functionalization of carbon powders with sulfophenyl groups can be confirmed by X-ray photoelectron spectroscopy measurements. The capacitive electrode carbon is derivitized at, for example, between 0.1% and 25% grafted groups per carbon atom, for example between 0.3% and 1.3% grafted groups per carbon atom. The resulting ionic group grafted carbon powder is formed into an electrode material by pressing into a stainless steel mesh current collector together with 5% fluorocarbon binder.

Example 22

In another example, showing polymerization directly onto the electrode pore surfaces, nanotube carbon, graphene, or other capacitive surface area carbon may be derivatized with controlled radical polymerization, for example the atom transfer radical polymerization method, reversible addition fragmentation chain transfer, the activators regenerated by electron transfers method, or initiators for continuous activator regeneration method. These methods may be used alone or in combination to synthesize controlled chain length, ionic group or ionomer functionalized polymers attached onto surface area capacitive carbon. Some of the strategies that may be used to prepare ionic group or ionomer-functionalized polymers attached to the electrode pore surfaces include the direct polymerization of functional monomers method, the post-polymerization modification of monomer units, use of functional radical polymerization initiators, and end-group transformation chemistry.

In this example, the carbon is first modified with an alkyl halide initiator to serve as an initiator for radical polymerization, in this case atom transfer radical polymerization to form a polymer or a polymer brush grafted carbon, according to, for example, the methods described in Shuhui Qin et. al., in Macromolecules vol. 37, pages 752-757 (2004), and Shuhui Qin et al. in J. AM. CHEM. SOC. Vol. 126, pages 170-176 (2004). Carboxylic acid groups are first formed on a 1000 B.E.T. surface area capacitive carbon electrode surface by nitric acid oxidation. Alkyl halide initiators are covalently attached to the carbon surface by esterification of 2-hydroxyethyl 2'-bromopropionate molecules with these carboxylic acid groups. Where initiators are attached or grouped together, brush polymers, star polymers and/or dendrimers may ultimately be formed. Polymers and controlled chain length polymers grafted onto carbon by this or other methods may, for example, subsequently be functionalized with ionic groups at the omega-end ($\omega$-end) of the polymer by nucleophilic substitution reactions, or may be sulfonated, aminated, or derivatized by any methods used to modify polystyrene, or other polymers with any ionic groups, including sulfate, amine, and other sulfur or nitrogen containing ionic groups, for use as ionic group grafted carbon flow through capacitor electrodes. The polymerization reaction can be stopped in order to control the molecular weight by cooling the reaction and oxidizing the catalyst by air or other methods. Qin et al. also describe how soluble methyl 2-bromopropionate may be added as a free initiator to obtain molecular weight control of the carbon grafted polymer.

The embodiments of the invention described above are intended to be merely exemplary, numerous variations and modifications will be apparent to those skilled in the art. All such variations and modifications are intended to be within the scope of the present invention as defined in any appended claims.

What is claimed is:
1. An electrode capacitor assembly comprising:
   (a) at least two capacitor electrodes comprising a pore structure such that each said capacitor electrode is a porous capacitor electrode having a pore volume, said pore volume having a surface for electrostatic adsorption and desorption of counter-ions and said pore volume comprising more than 30% of micropores, mesopores, or a combination of micropores and mesopores;

(b) a flow channel configured for passage of an ionic fluid, wherein, in operation, said flow channel is in ionic communication with said two capacitor electrodes; and (c) at least one ionic group attached to the surface of the pore volume of each said porous capacitor electrode, whereby a first said porous capacitor electrode having a first pore volume is an anion-permeable electrode comprising cationic groups attached to the surface of said first pore volume and whereby a second porous capacitor electrode having a second pore volume is a cation-permeable electrode comprising anionic groups attached to the surface of said second pore volume, wherein said cationic groups are attached with a length having a range from at least one or more atoms long to 25 nanometers long, and wherein said anionic groups are attached with a length having a range from at least one or more atoms long to 25 nanometers long.

2. The electrode capacitor assembly of claim 1, further comprising a fluid in said flow channel, wherein said fluid has a pH, and wherein the cationic groups attached within the first pore volume have a pKa that is at least one pKa unit higher than said fluid pH.

3. The electrode capacitor assembly of claim 1, further comprising a fluid in said flow channel, wherein said fluid has a pH, and wherein the anionic groups attached within the second pore volume have a pKa that is at least one pKa unit lower than said fluid pH.

4. The electrode capacitor assembly of claim 1, wherein said cationic group and said anionic group is each attached to said surface of said first and second pore volume, respectively, by a hydrophobic moiety.

5. The electrode capacitor assembly of claim 1, wherein at least one of said porous capacitor electrodes comprises a carbon material, and said cationic group is attached covalently to said surface of said first pore volume and said anionic group is attached covalently to said second pore volume.

6. The electrode capacitor assembly of claim 5, wherein said surface group comprises oxygen, carboxyl, quinone, amine, or polythiophene polymer.

7. The electrode capacitor assembly of claim 5, wherein said surface group is formed by oxidation, amidation, or silanization.

8. The electrode capacitor assembly of claim 5, wherein said cationic group and said anionic group is each attached to said surface group by a linker, tether, or long chain molecule.

9. The electrode capacitor assembly of claim 1, wherein said attached cationic groups fill over 50% of total first pore volume and said attached anionic groups fill over 50% of total second pore volume.

10. The electrode capacitor assembly of claim 1, having a characteristic selected from the group consisting of (a) a Donnan exclusion of coions from said first electrode pore volume of 50% or more relative to a concentration of co-ions outside of the electrode pore volume; and (b) a Donnan exclusion of coions from said second electrode pore volume of 50% or more relative to a concentration of co-ions outside of the electrode pore volume.

11. The electrode capacitor assembly of claim 1, wherein, in operation, said attached cationic groups are strong base cationic groups.

12. The electrode capacitor assembly of claim 1, wherein, in operation, said anionic groups are strong acid anionic groups.

13. The electrode capacitor assembly of claim 1, wherein the cationic group has a mass of less than 1000 Daltons.

14. The electrode capacitor assembly of claim 1, wherein said cationic group is a surfactant compound adsorbed onto the surface of the first pore volume and said anionic group is a surfactant compound adsorbed onto the surface of the second pore volume.

15. The electrode capacitor assembly of claim 1, wherein at least one of said capacitor electrodes is formed by derivitization of unconsolidated, powdered, fibrous, particulate, granular, or divided material.

16. The electrode capacitor assembly of claim 1, wherein at least one of said capacitor electrodes is prepared from a material selected from the group consisting of carbon aerogel, activated carbon, carbon black, ceramic, conductive polymers, activated carbon cryogel, nanoporous carbide carbon, high surface area graphite, nanotubes, nanotube membranes, ionic group functionalized nanotubes, nanohorns, carbon nano-networks, carbon microflakes, edge plane carbons, and graphene materials.

17. The electrode capacitor assembly of claim 1, wherein at least one of said capacitor electrodes is prepared from a carbon material having an average particle size of less than 100 microns.

18. The electrode capacitor assembly of claim 1, further comprising at least one current collector in electrical communication with a facing area of at least one of said capacitor electrodes.

19. The electrode capacitor assembly of claim 18, wherein said current collector comprises a metal foil laminated with electrochemically protective layers.

20. The electrode capacitor assembly of claim 1, wherein said fluid channel comprises a flow spacer that has a Young's modulus of 0.05 GPa or higher.

21. The electrode capacitor assembly of claim 1 with an integrally attached electrode and current collector with a tensile strength of 50 kPa or higher.

22. The electrode capacitor assembly of claim 1, wherein at least a portion of the first pore volume is occupied by a double layer and constitutes a majority proportion of total first pore volume and wherein at least a portion of the second pore volume is occupied by a double layer and constitutes a majority proportion of total second pore volume.

23. The electrode capacitor assembly of claim 1, wherein said capacitor electrodes are prepared from a material having greater than 300 square meters per gram B.E.T.

24. The electrode capacitor assembly of claim 1, wherein said assembly is further in electrical communication with a power supply, wherein said first electrode is a cathode and said second electrode is an anode, and wherein anionic feed ions from said fluid adsorb to a surface of said first electrode, and wherein cationic feed ions from said fluid adsorb to a surface of said second electrode.

25. The electrode capacitor assembly of claim 24, having an electrical series resistance of less than 50 ohms cm$^2$ and a parallel resistance of greater than 100 ohm cm$^2$.

26. A method of deionizing a fluid comprising including the electrode capacitor assembly of claim 1 in a flow through capacitor system, applying an electrical charge to each of said capacitor electrodes in said electrode assembly, placing said flow channel in ionic communication with a fluid, and allowing electrostatic adsorption of ions from said fluid in said flow channel onto said capacitor electrodes.

27. A method of concentrating ions in a fluid, comprising performing the method of claim 26, and further comprising reversing said electrical charge between each of said capacitor electrodes and allowing electrostatic desorption of ions from said capacitor electrodes into said fluid in said flow channel.

28. The electrode capacitor assembly of claim 1, further comprising at least one current collector in electrical communication with a facing area of at least one of said capacitor electrodes; and wherein said assembly is a chargeable and dischargeable electrode capacitor assembly, said cationic groups are more than 50% ionized, said anionic groups are more than 50% ionized, and said capacitor electrodes are prepared from a material having greater than 300 square meters per gram B.E.T.

29. The electrode of claim 1, wherein each of said capacitor electrodes is 2 millimeters thick or less.

30. The electrode of claim 29, wherein each of said capacitor electrodes is 1 millimeter thick or less.

31. The electrode capacitor assembly of claim 1, wherein said cationic groups comprises tertiary amines, quaternary amines, ammonium or quaternary ammonium and said anionic groups comprises sulfonate, sulfate, phosphate, carboxylate, or polyoxyethylene sulfates.

32. The electrode capacitor assembly of claim 1, wherein the anionic group has a mass of less than 1000 Daltons.

33. The electrode capacitor assembly of claim 1, wherein the pore volume of each said capacitor electrode comprises more than 60% micropores, mesopores, or a combination of micropores and mesopores.

34. The electrode capacitor assembly of claim 1, wherein the pore volume of each said capacitor electrode comprises more than 90% micropores, mesopores, or a combination of micropores and mesopores.

35. The electrode capacitor assembly of claim 1, wherein each of the pore structures comprises pores having an average pore size of under 50 nanometers.

36. The electrode capacitor assembly of claim 1, wherein each of the pore structures comprises pores having an average pore size of under 20 nanometers.

37. The electrode capacitor assembly of claim 1, wherein each of the pore structures comprises pores having an average pore size of under 2 nanometers.

38. A fluid flow through capacitor cell comprising:
(a) at least two capacitor electrodes having a surface area for electrostatic adsorption and desorption of ions and comprising a pore structure such that each said capacitor electrode is a porous capacitor electrode having a pore volume having pore surfaces;
(b) a flow channel for the passage of an ionic fluid having a pH, said flow channel in ionic communication with said two capacitor electrodes;
(c) fluid in said flow channel;
(d) at least one ionic group attached to the surface of the pore volume of each said porous capacitor electrode, wherein a first said porous capacitor electrode having a first pore volume comprises cationic groups attached within 25 nanometers of the surface of said first pore volume, said cationic groups having a pKa that is at least one pKa unit higher than said fluid pH; and
(e) wherein a second porous capacitor electrode having a second pore volume comprises anionic groups attached within 25 nanometers of the surface of said second pore volume, said anionic groups having a pKa that is at least one pKa unit lower than said fluid pH,
wherein at least a portion of the first pore volume is occupied by a double layer and constitutes a majority proportion of total first pore volume and wherein at least a portion of the second pore volume is occupied by a double layer and constitutes a majority proportion of total second pore volume and the cationic groups are within the double layer of the first pore volume and the anionic groups are within the double layer of the second pore volume.

39. The electrode capacitor assembly of claim 38, wherein the pore volume of each said capacitor electrode comprises more than 30% micropores, mesopores, or a combination of micropores and mesopores.

40. The electrode capacitor assembly of claim 38, wherein the pore volume of each said capacitor electrode comprises more than 60% micropores, mesopores, or a combination of micropores and mesopores.

41. The electrode capacitor assembly of claim 38, wherein the pore volume of each said capacitor electrode comprises more than 90% micropores, mesopores, or a combination of micropores and mesopores.

42. The electrode capacitor assembly of claim 38, wherein each of the pore structures comprises pores having an average pore size of under 50 nanometers.

43. The electrode capacitor assembly of claim 38, wherein each of the pore structures comprises pores having an average pore size of under 20 nanometers.

44. The electrode capacitor assembly of claim 38, wherein each of the pore structures comprises pores having an average pore size of under 2 nanometers.

45. A method of making an electrode capacitor assembly comprising:
(a) providing at least two capacitor electrodes comprising a pore structure such that each said capacitor electrode is a porous capacitor electrode having a pore volume, said pore volume having a surface for electrostatic adsorption and desorption of counter-ions and said pore volume comprising more than 30% of micropores, mesopores, or a combination or micropores and mesopores;
(b) configuring a flow channel between the at least two capacitor electrodes for passage of an ionic fluid so that, in operation, said flow channel is in ionic communication with said two capacitor electrodes; and
(c) attaching at least one ionic group within 25 nanometers of the surface of the pore volume of each said porous capacitor electrode, whereby a first said porous capacitor electrode having a first pore volume is an anion-permeable electrode comprising cationic groups attached within 25 nanometers of the surface of said first pore volume and whereby a second porous capacitor electrode having a second pore volume is a cation-permeable electrode comprising anionic groups within 25 nanometers of the surface of said second pore volume.

46. An electrode capacitor assembly comprising:
(a) at least two capacitor electrodes comprising a pore structure such that each said capacitor electrode is a porous capacitor electrode having a pore volume, said pore volume having a surface for electrostatic adsorption and desorption of counter-ions, and said pore volume comprising more than 30% micropores, mesopores, or a combination of micropores and mesopores;
(b) a flow channel for passage of an ionic fluid, wherein, in operation, said flow channel is in ionic communication with said two capacitor electrodes; and
(c) at least one ionic group attached to the surface of the pore volume of each said porous capacitor electrode, whereby a first said porous capacitor electrode having a first pore volume is an anion-permeable electrode comprising cationic groups attached to the surface of said first pore volume and, in operation, excluding cationic co-ions from said first electrode, and whereby a second porous capacitor electrode having a second pore volume is a cation-permeable electrode comprising anionic groups attached to said second pore volume and, in operation, excluding anionic co-ions from said second electrode; and (d) fluid in said flow channel, wherein said fluid has a pH, and wherein the cationic groups within the first pore volume have a pKa, and wherein the anionic groups within the second pore volume have a pKa.

47. The electrode capacitor assembly of claim 46, wherein the pore volume of each said capacitor electrode comprises more than 60% micropores, mesopores, or a combination of micropores and mesopores.

48. The electrode capacitor assembly of claim 46, wherein the pore volume of each said capacitor electrode comprises more than 90% micropores, mesopores, or a combination of micropores and mesopores.

* * * * *